US012578873B2

(12) United States Patent
Shono et al.

(10) Patent No.: US 12,578,873 B2
(45) Date of Patent: Mar. 17, 2026

(54) MEMORY SYSTEM AND METHOD

(71) Applicant: Kioxia Corporation, Tokyo (JP)

(72) Inventors: Atsuo Shono, Kamakura Kanagawa (JP); Kiyotaka Iwasaki, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/461,659

(22) Filed: Sep. 6, 2023

(65) Prior Publication Data

US 2024/0201866 A1     Jun. 20, 2024

(30) Foreign Application Priority Data

Dec. 19, 2022    (JP) ................................. 2022-202224

(51) Int. Cl.
*G06F 3/06* (2006.01)
*G06F 12/02* (2006.01)

(52) U.S. Cl.
CPC .......... *G06F 3/0619* (2013.01); *G06F 3/0656* (2013.01); *G06F 3/0659* (2013.01); *G06F 3/0673* (2013.01); *G06F 12/023* (2013.01)

(58) Field of Classification Search
CPC .... G06F 3/0656; G06F 3/0659; G06F 3/0673; G06F 12/023; G06F 3/0619
USPC ....................................................... 711/154
See application file for complete search history.

(56) References Cited

U.S. PATENT DOCUMENTS

| | | | |
|---|---|---|---|
| 10,346,072 B1 | 7/2019 | Peterson et al. | |
| 2014/0281123 A1* | 9/2014 | Weber ................. | G06F 11/2089 |
| | | | 711/103 |
| 2016/0041790 A1* | 2/2016 | Jones ...................... | G11C 7/10 |
| | | | 714/773 |
| 2016/0098192 A1 | 4/2016 | Ochi | |
| 2016/0266793 A1* | 9/2016 | Saito ................... | G06F 12/0638 |
| 2018/0081590 A1* | 3/2018 | Farahani ............. | G06F 13/1673 |
| 2019/0180793 A1* | 6/2019 | Berman ................ | G11C 5/141 |
| 2022/0147444 A1 | 5/2022 | Xu et al. | |
| 2022/0269434 A1* | 8/2022 | Shin ..................... | G06F 3/0631 |
| 2022/0291857 A1 | 9/2022 | Jain | |
| 2023/0195370 A1* | 6/2023 | Porzio .................. | G06F 3/0634 |
| | | | 711/154 |

* cited by examiner

*Primary Examiner* — Gautam Sain
(74) *Attorney, Agent, or Firm* — Maier & Maier, PLLC

(57) ABSTRACT

According to an embodiment, a memory system includes a memory controller. At a first timing within a period from allocation of an area unit to completion of a data-in operation on the data unit stored in an area unit, the memory controller deallocates the area unit upon the completion of the data-in operation on the data unit when a usage of a buffer area is smaller than a first threshold value. At the first timing, the memory controller deallocates the area unit upon completion of the program operation on the data unit when the usage of the buffer area is larger than a second threshold value. The second threshold value is larger than the first threshold value.

24 Claims, 17 Drawing Sheets

Figure 7:
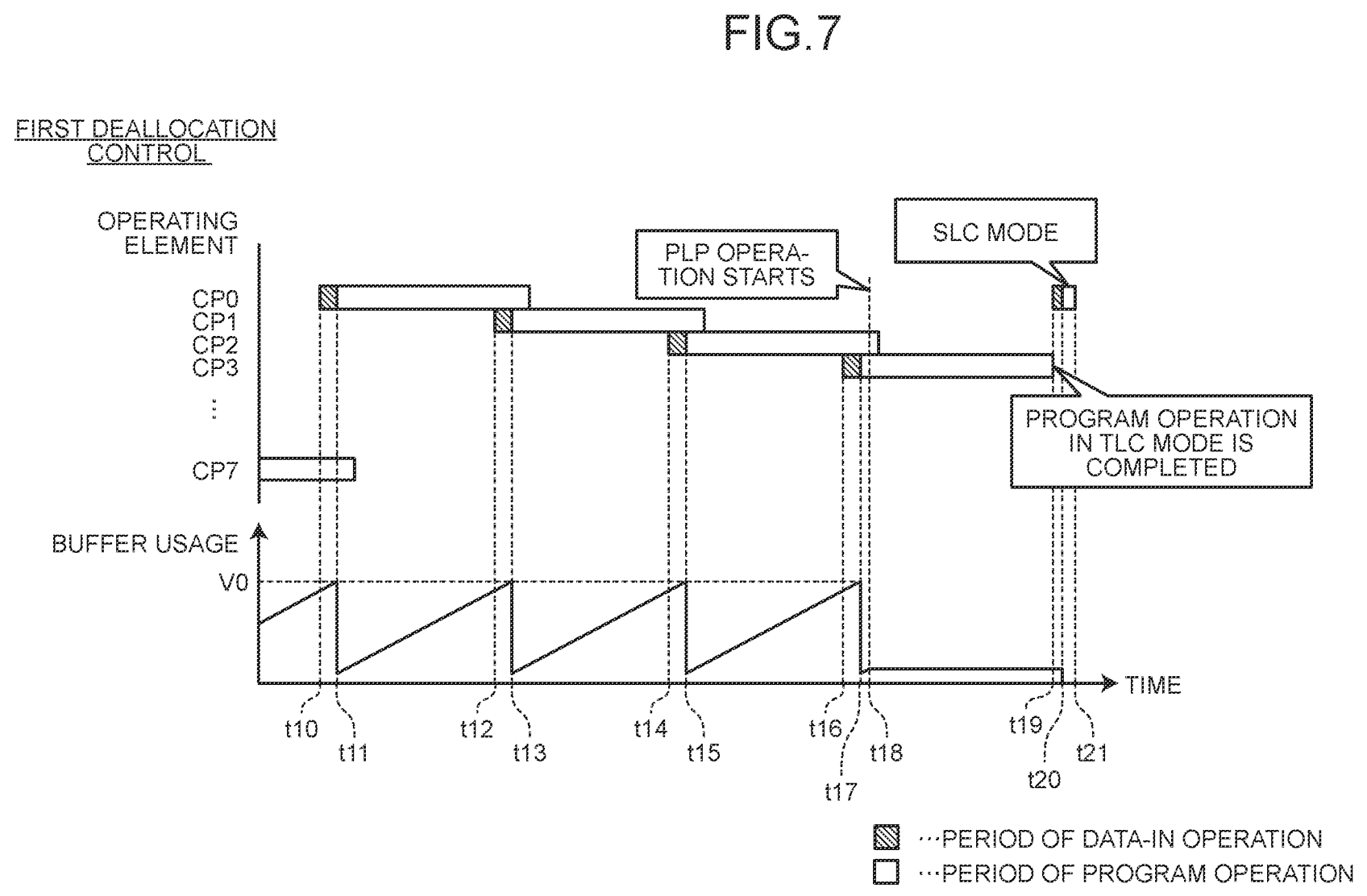

FIRST DEALLOCATION CONTROL

SLC MODE

PROGRAM OPERATION IN TLC MODE IS COMPLETED

PLP OPERA-TION STARTS

OPERATING ELEMENT

CP0
CP1
CP2
CP3
...
CP7

BUFFER USAGE

V0

TIME t10  t11  t12  t13  t14  t15  t16  t17  t18  t19  t20  t21

...PERIOD OF DATA-IN OPERATION

...PERIOD OF PROGRAM OPERATION

FIG.15

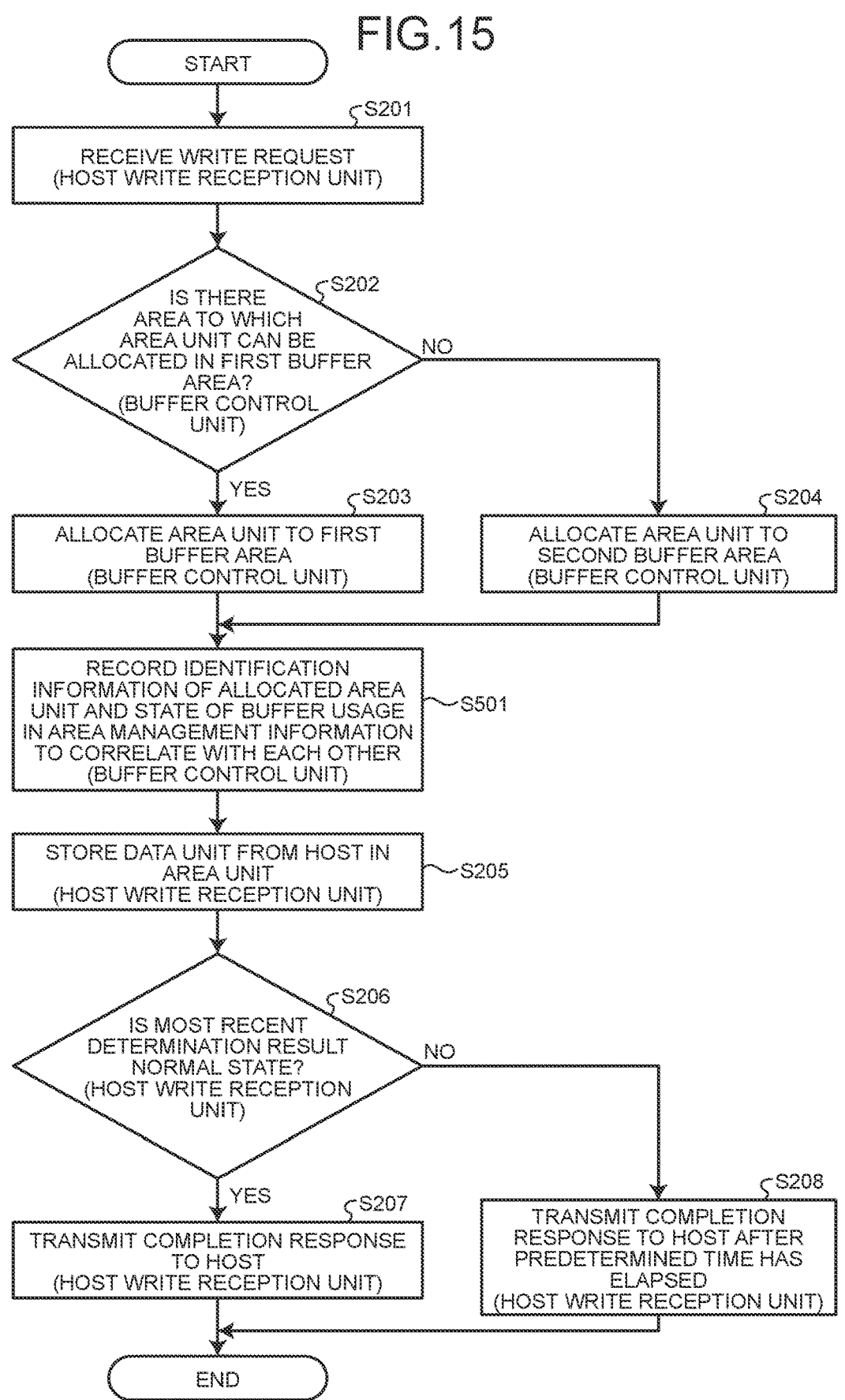

START

RECEIVE WRITE REQUEST
(HOST WRITE RECEPTION UNIT) ⌐S201

IS THERE
AREA TO WHICH
AREA UNIT CAN BE
ALLOCATED IN FIRST BUFFER
AREA?
(BUFFER CONTROL
UNIT) ⌐S202

NO

YES ⌐S203

ALLOCATE AREA UNIT TO FIRST
BUFFER AREA
(BUFFER CONTROL UNIT)

ALLOCATE AREA UNIT TO
SECOND BUFFER AREA
(BUFFER CONTROL UNIT) ⌐S204

RECORD IDENTIFICATION
INFORMATION OF ALLOCATED AREA
UNIT AND STATE OF BUFFER USAGE
IN AREA MANAGEMENT INFORMATION
TO CORRELATE WITH EACH OTHER
(BUFFER CONTROL UNIT) ⌐S501

STORE DATA UNIT FROM HOST IN
AREA UNIT
(HOST WRITE RECEPTION UNIT) ⌐S205

IS MOST RECENT
DETERMINATION RESULT
NORMAL STATE?
(HOST WRITE RECEPTION
UNIT) ⌐S206

NO

YES ⌐S207

TRANSMIT COMPLETION RESPONSE
TO HOST
(HOST WRITE RECEPTION UNIT)

TRANSMIT COMPLETION
RESPONSE TO HOST AFTER
PREDETERMINED TIME HAS
ELAPSED
(HOST WRITE RECEPTION UNIT) ⌐S208

END

MEMORY SYSTEM AND METHOD

CROSS-REFERENCE TO RELATED APPLICATIONS

This application is based upon and claims the benefit of priority from Japanese Patent Application No. 2022-202224, filed on Dec. 19, 2022, the entire contents of which are incorporated herein by reference.

FIELD

Embodiments described herein relate generally to a memory system and a method.

BACKGROUND

In the related art, memory systems including a nonvolatile memory and a volatile memory have been known. The nonvolatile memory functions as a storage. The volatile memory is used as a buffer for data to be written in the nonvolatile memory.

The memory system may have a capacitor. In a case where power loss is detected, the memory system writes data stored in the volatile memory to the nonvolatile memory by using electric energy stored in the capacitor. The data stored in the volatile memory is thereby saved in the nonvolatile memory, and, as a result, the data is prevented from being lost from the memory system. Such a function has been known as a power loss protection (PLP) function.

BRIEF DESCRIPTION OF THE DRAWINGS

FIG. 1 is a schematic diagram illustrating an example of the configuration of a memory system according to an embodiment;

FIG. 2 is a schematic diagram illustrating an example of the configuration of a memory chip of the embodiment;

FIG. 7 is a schematic diagram for describing a first deallocation control of the embodiment;

FIG. 15 is a flowchart illustrating an example of an operation when the memory system of the first modification of the embodiment receives a write request from a host;

DETAILED DESCRIPTION

Figure 3:
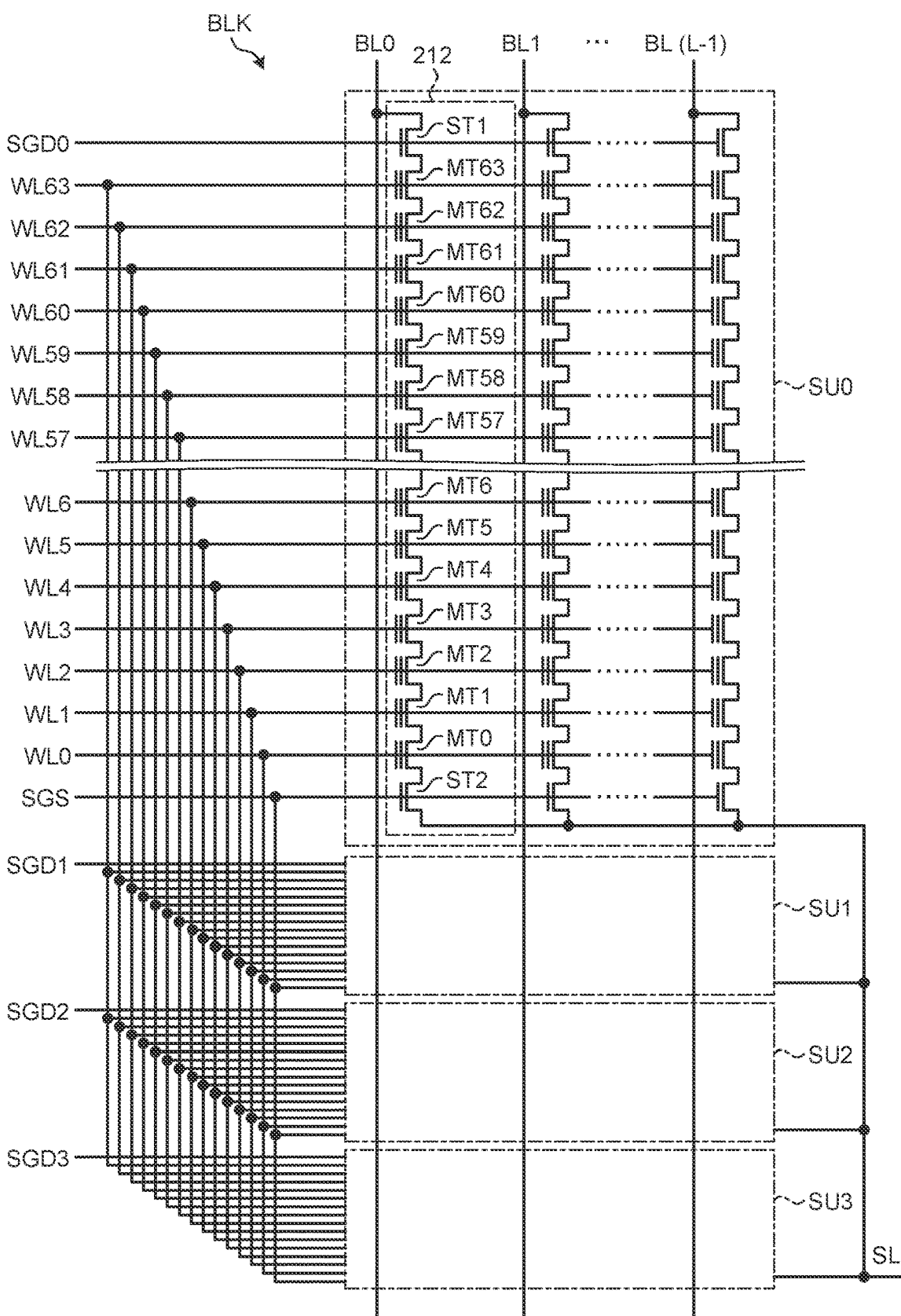
FIG. 3 is a schematic diagram illustrating a circuit configuration of a block of the embodiment.

According to one embodiment, a memory system is connectable to a host. The memory system includes a non-volatile first memory in which a memory cell array including a plurality of memory cells is provided, a volatile second memory, and a memory controller. The memory controller is configured to, in response to receiving a write request from the host, allocate an area unit to a buffer area of the second memory, store a data unit in the area unit, the data unit being requested by the write request to be written to the first memory, and execute, on the data unit, a write operation including a data-in operation and a program operation. The data-in operation is an operation of transferring the data unit to the first memory. The program operation is an operation of writing the data unit transferred to the first memory by the data-in operation to the memory cell array. The memory controller is further configured to, at a first timing within a period from the allocation of the area unit to completion of the data-in operation on the data unit stored in the area unit, deallocate the area unit upon the completion of the data-in operation on the data unit when a usage of the buffer area is in a first state in which the usage of the buffer area is smaller than a first threshold value, and deallocate the area unit upon completion of the program operation on the data unit when the usage of the buffer area is in a second state in which the usage of the buffer area is larger than a second threshold value. The second threshold value is larger than the first threshold value.

Hereinafter, a memory system and a method according to the embodiment will be described in detail by referring to the accompanying drawings. Note that the present invention is not limited by the embodiment.

Embodiment

Figure 1:
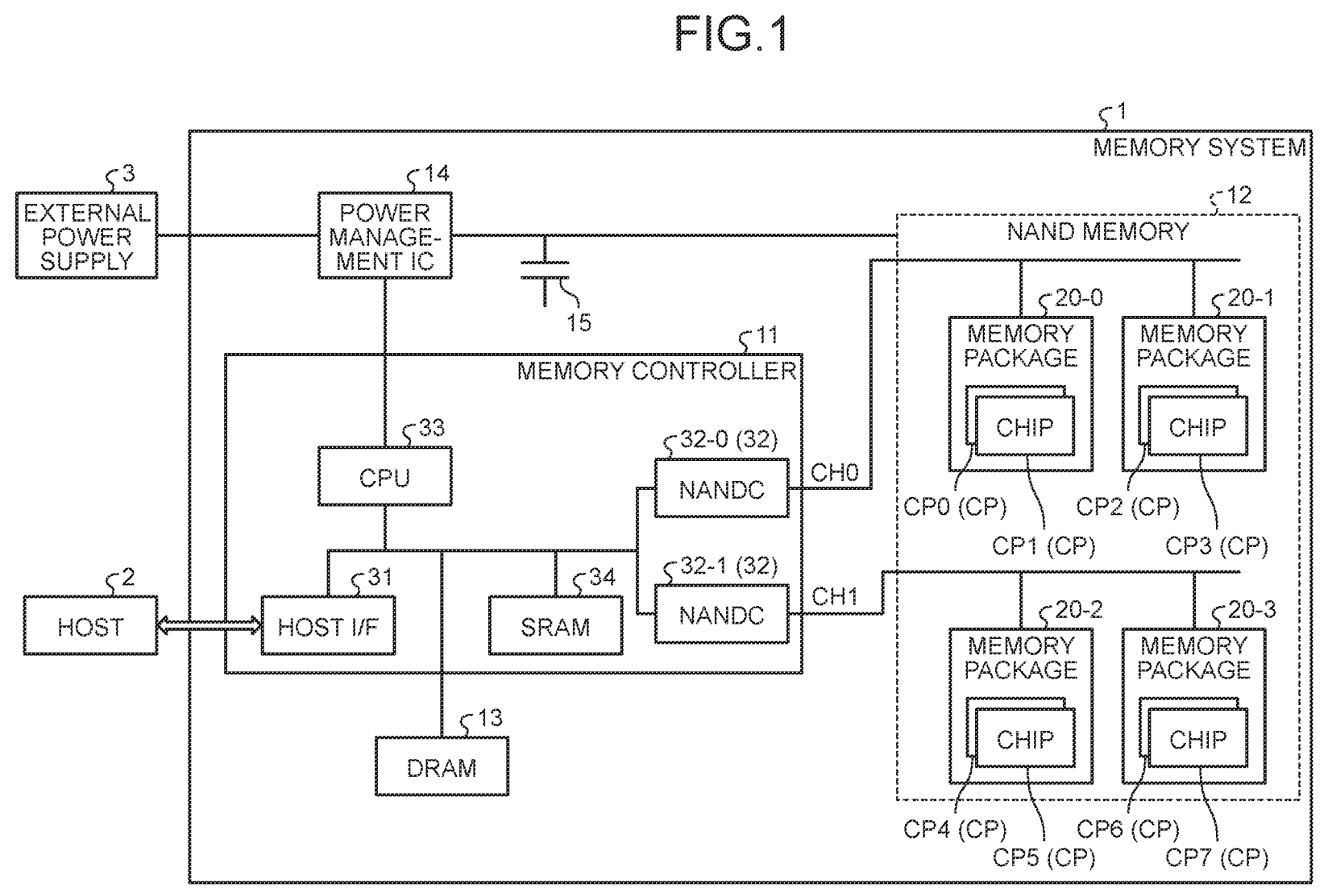

FIG. 1 is a schematic diagram illustrating an example of the configuration of a memory system according to an embodiment. As illustrated in FIG. 1, a memory system 1 can be connected to a host 2 by a predetermined communication interface. The host 2 is, for example, a processor, a personal computer, a personal information terminal, or a server. The memory system 1 can receive various requests from the host 2. The various requests include a write request or a read request. When connected to an external power supply 3, the memory system 1 receives power supplied from the external power supply 3. The external power supply 3 may be incorporated in the host 2.

The memory system 1 includes a memory controller 11, a NAND-type flash memory (NAND memory) 12, a dynamic random access memory (DRAM) 13, a power management integrated circuit (IC) 14, and a power storage device 15.

The NAND memory 12 is a nonvolatile memory that functions as a storage. The NAND memory 12 includes one or more memory chips CP. In FIG. 1, eight memory chips CP0 to CP7 are illustrated as an example of the one or more memory chips CP. The memory chips CP may be configured as one package sealed with resin or the like. As one example, a memory package 20-0 including the memory chips CP0 and CP1, a memory package 20-1 including the memory chips CP2 and CP3, a memory package 20-2 including the memory chips CP4 and CP5, and a memory package 20-3 including the memory chips CP6 and CP7 are illustrated.

The memory controller 11 and the NAND memory 12 are connected via one or more channels. As one example, the memory system 1 includes two channels CH0 and CH1. The two channels CH0 and CH1 are connected to the memory controller 11. The memory packages 20-0 and 20-1 are connected to the channel CH0, and the memory packages 20-2 and 20-3 are connected to the channel CH1.

Note that the number of channels, the number of memory chips CP, the number of memory packages 20, and the wiring between the memory controller 11 and each of the memory chips CP included in the memory system 1 are not limited to this example.

The memory controller 11 executes various types of processing including data transfer between the host 2 and the NAND memory 12. As a configuration for this purpose, the memory controller 11 includes a host interface (I/F) 31, one or more NAND controllers (NAND) 32, a central processing unit (CPU) 33, and a static random access memory (SRAM) 34.

The host I/F 31 controls transfer of information such as a request and data communicated with the host 2.

The CPU 33 controls the entire memory controller 11 on the basis of a firmware program.

On the basis of an instruction from the CPU 33, the NANDC 32 transfers a command for accessing the NAND memory 12 via a channel to a target memory chip CP, or transfers data corresponding to the command to the NAND memory 12. An access to the NAND memory 12 includes the writing of data, the reading of data, and the erasing of data.

In the example illustrated in FIG. 1, the memory controller 11 includes two NANDCs 32-0 and 32-1 as an example of the one or more NANDCs. The NANDC 32-0 controls transfer of commands and data via the channel CH0, and the NANDC 32-1 controls transfer of commands and data via the channel CH1. The number of NANDCs 32 included in the memory controller 11 is not limited to two.

The SRAM 34 provides an area as a buffer or a cache to the memory controller 11 together with the DRAM 13. For example, the memory controller 11 may use the DRAM 13 or the SRAM 34 as a buffer for data transferred between the host 2 and the NAND memory 12 or as an area for temporarily storing various types of management information such as logical-to-physical address translation information. The logical-to-physical address translation information is information indicating the correspondence between a logical address used by the host 2 to designate a position of data and a physical address indicating a position where the data is stored in the NAND memory 12.

The DRAM 13 operates at a lower speed and has a larger capacity than the SRAM 34. The memory controller 11 preferentially selects the SRAM 34 over the DRAM 13 as a data buffer destination. Control of the data buffer will be described later.

The power management IC 14 generates power for driving the memory controller 11, the NAND memory 12, and the DRAM 13 on the basis of power input from the external power supply 3. Then, the power management IC 14 supplies the generated power to these components.

The power storage device 15 can store electric energy. The power storage device 15 is, for example, a chargeable capacitor or battery. Hereinafter, the power storage device 15 is referred to as a capacitor 15. When power is supplied from the external power supply 3, the capacitor 15 is charged by the power management IC 14 and stores electric energy. In a case where power loss occurs, namely, in a case where the power supply from the external power supply 3 is stopped, the power supply source is switched from the external power supply 3 to the capacitor 15 by the power management IC 14. As a result, power is supplied to the memory controller 11, the NAND memory 12, and the DRAM 13 via the power management IC 14 from the electric energy stored in the capacitor 15. The memory controller 11, the NAND memory 12, and the DRAM 13 can operate using the electric energy stored in the capacitor 15 for a while even after the power supply from the external power supply 3 is stopped. The memory controller 11 executes a power loss protection (PLP) operation of saving data stored in a volatile memory (in this case, the DRAM 13 or the SRAM 34) to a nonvolatile memory (in this case, the NAND memory 12) by using the electric energy stored in the capacitor 15.

In one example, the power management IC 14 monitors the voltage supplied from the external power supply 3. In a case where the voltage falls below a predetermined level, the power management IC 14 makes a decision that power loss has occurred and transmits a power loss signal to the CPU 33 included in the memory controller 11. Then, the power management IC 14 switches the power supply source from the external power supply 3 to the capacitor 15. The CPU 33 starts the PLP operation in response to the power loss signal from the power management IC 14.

Note that the element that detects the power loss may not be the power management IC 14. For example, the CPU 33 may detect the power loss.

Any capacitor may be used as the capacitor 15. For example, an electrolytic capacitor or an electrical double layer capacitor may be employed as the capacitor 15.

Cases of stopping power supply from the external power supply 3 may include a case in which power supply is stopped after the memory system 1 receives a notice in advance from the host 2 and a case in which power supply is stopped without such a notice. The memory controller 11 may be shut down the memory system 1 by performing processes similar to the PLP operation in response to the notice when the notice is received, and may start the PLP operation in response to the power loss signal when the power supply is stopped without the notice. Note that, in the present specification, the power loss includes at least a case in which power supply is stopped without the notice.

Note that the NAND memory 12 is an example of a first memory that is nonvolatile. The DRAM 13 and the SRAM 34 are examples of a second memory that is volatile. The SRAM 34 is an example of a third memory. The DRAM 13 is an example of a fourth memory.

Figure 2:
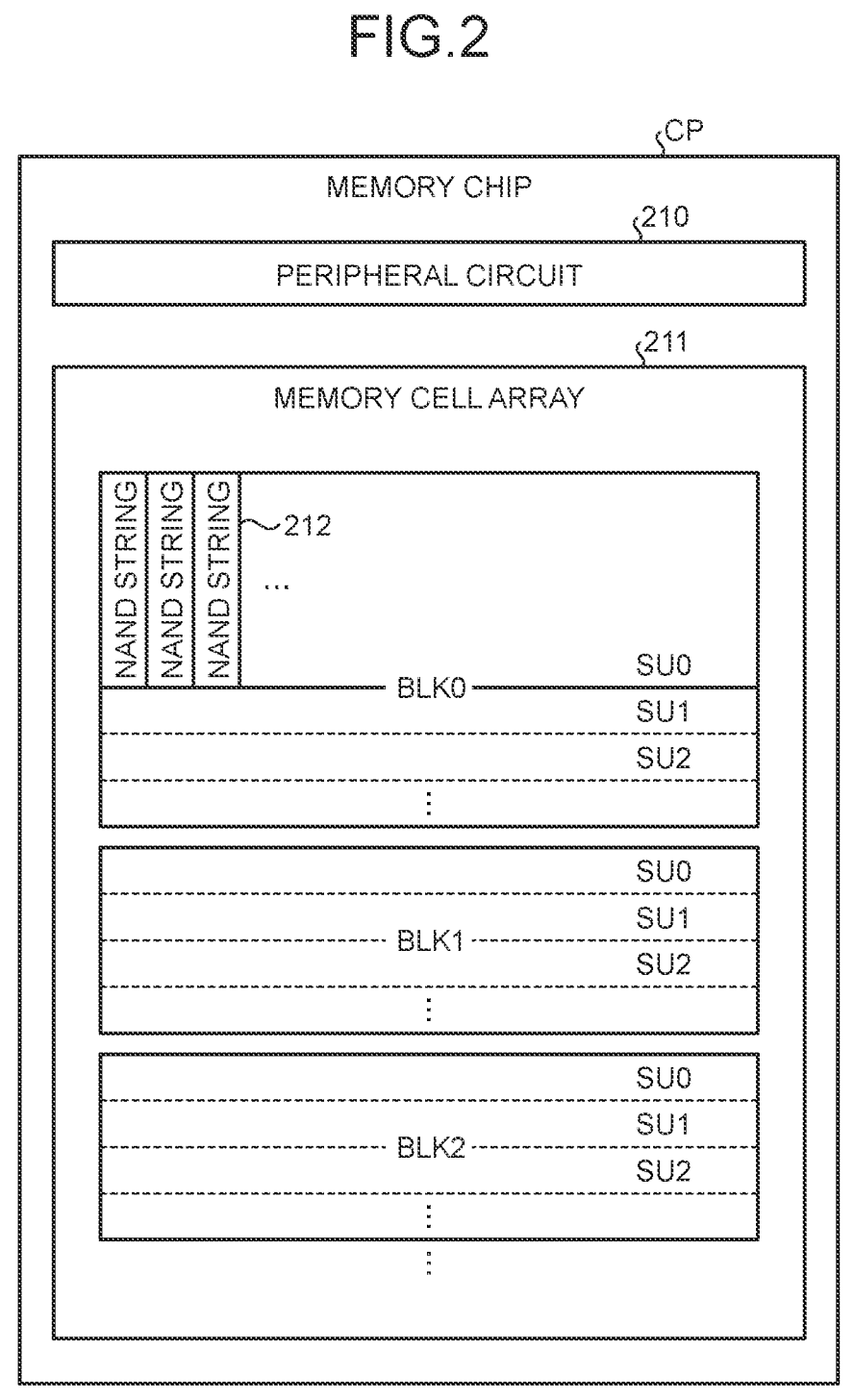

FIG. 2 is a schematic diagram illustrating an example of the configuration of a memory chip CP according to the embodiment. The memory chip CP includes a peripheral circuit 210 and a memory cell array 211.

The memory cell array 211 includes a plurality of blocks BLK (BLK0, BLK1, BLK2, etc.). Each of the blocks BLK includes a plurality of string units SU (SU0, SU1, SU2, etc.). Each of the string units SU includes a plurality of NAND strings 212. Each of the NAND strings 212 includes a plurality of nonvolatile memory cell transistors connected in series. Note that the number of NAND strings 212 in a string unit SU can be any number. The number of memory cell transistors in a NAND string 212 can be any number.

The peripheral circuit 210 includes, for example, a row decoder, a column decoder, a sense amplifier, a latching circuit, and a voltage generation circuit. The peripheral circuit 210 executes, in response to a command from the memory controller 11, an operation corresponding to the command on the memory cell array 211.

Note that the command from the memory controller 11 to the memory chip CP includes a data-in command, a program command, a sense command, a data-out command, an erase command, etc.

The data-in command is a command that instructs the peripheral circuit 210 to receive write data that is input from the memory controller 11 to the memory chip CP. The transfer of the write data from the memory controller 11 to the memory chip CP is also referred to as a data-in operation.

The program command is a command that instructs the peripheral circuit 210 to execute a program operation. The program operation is an operation of writing data input to the memory chip CP (more specifically, input to a latch circuit (not illustrated) included in the peripheral circuit 210) by the data-in operation to the memory cell array 211.

The sense command is a command that instructs the peripheral circuit 210 to execute a sense operation. The sense operation is an operation of transferring data stored in the memory cell array 211 to a latch circuit included in the peripheral circuit 210.

The data-out command is a command that instructs the peripheral circuit 210 to output data stored in the latch circuit included in the peripheral circuit 210 to the memory controller 11. The transfer of the read data from the memory chip CP to the memory controller 11 in response to the data-out command is also referred to as a data-out operation.

The erase command is a command that instructs the peripheral circuit 210 to execute an erase operation. The erase operation is an operation of erasing data stored in the memory cell array 211.

FIG. 3 is a schematic diagram illustrating a circuit configuration of a block BLK of the embodiment. Note that every block BLK has the same structure. The block BLK includes, for example, four string units SU0 to SU3. Each of the string units SU includes a plurality of NAND strings 212.

Each of the NAND strings 212 includes, for example, sixty-four memory cell transistors MT (MT0 to MT63) and select transistors ST1 and ST2. A memory cell transistor MT includes a control gate and a charge storage layer and holds data in a nonvolatile manner. The sixty-four memory cell transistors MT (MT0 to MT63) are connected in series between the source of the select transistor ST1 and the drain of the select transistor ST2. Note that the memory cell transistor MT may be a metal-oxide-nitride-oxide-silicon (MONOS) type in which an insulating film is used for the charge storage layer or may be a floating gate (FG) type in which a conductive film is used for the charge storage layer. The number of memory cell transistors MT in the NAND string 212 is not limited to sixty-four.

The gates of select transistors ST1 included in the string units SU0 to SU3 are connected to select gate lines SGD0 to SGD3, respectively. On the other hand, the gates of select transistors ST2 included in the string units SU0 to SU3 are commonly connected to, for example, a single select gate line SGS. The gates of the select transistors ST2 included in the string units SU0 to SU3 may be individually connected to select gate lines SGS0 to SGS3 (not illustrated) that are different for each string unit SU. The control gates of memory cell transistors MT0 to MT63 included in the same block BLK are commonly connected to word lines WL0 to WL63, respectively.

The drains of select transistors ST1 of NAND strings 212 included in a string unit SU are connected to different bit lines BL (BL0 to BL(L−1), where L is a natural number larger than or equal to 2). In addition, a bit line BL commonly connects the corresponding NAND string 212 of each string unit SU of the blocks BLK. Moreover, the sources of select transistors ST2 are commonly connected to a source line SL.

That is, a string unit SU is a set of NAND strings 212 connected to different bit lines BL and connected to the same select gate line SGD. Moreover, the block BLK is a set of string units SU sharing a word line WL. Moreover, memory cell array 211 is a set of blocks BLK sharing at least one bit line BL.

The program operation and the sense operation by the peripheral circuit 210 can be collectively executed on memory cell transistors MT connected to one word line WL in one string unit SU. A group of the memory cell transistors MT collectively selected during the program operation or the sense operation is referred to as a memory cell group MCG. The size of a group of 1-bit data stored in each of the memory cell transistors MT in one memory cell group MCG is referred to as a page.

The erase operation by the peripheral circuit 210 is executed for each block BLK. That is, all the data stored in one block BLK is erased collectively.

Note that the structure of the memory cell array 211 is not limited to the structure illustrated in FIGS. 2 and 3. For example, the memory cell array 211 may have a structure in which NAND strings 212 are two-dimensionally or three-dimensionally arrayed.

In the program operation, the peripheral circuit 210 injects charges of an amount corresponding to write data into a charge storage layer of each of the memory cell transistors MT included in a memory cell group MCG of a write destination. Then, in the sense operation, the peripheral circuit 210 reads data corresponding to the charge amount accumulated in the charge storage layer from each of the memory cell transistors MT included in a memory cell group MCG storing the data to be read.

Each memory cell transistor MT can store a value of n (n≥1) bits. A mode in which n is 1 is referred to as a single level cell (SLC) mode. In a case where each memory cell transistor MT stores an n-bit value, the storage capacity per memory cell group MCG is equal to the size of n pages. The mode in which n is 2 is referred to as a multi-level cell (MLC) mode. A mode in which n is 3 is referred to as a triple level cell (TLC) mode. A mode in which n is 4 is referred to as a quad level cell (QLC) mode.

A threshold voltage of each memory cell transistor MT is controlled within a given range by the peripheral circuit 210. The controllable range of the threshold voltage is divided into sections of a number of n-th power of 2. Each of the sections is assigned a value selected from different n-bit values.

Figure 4:
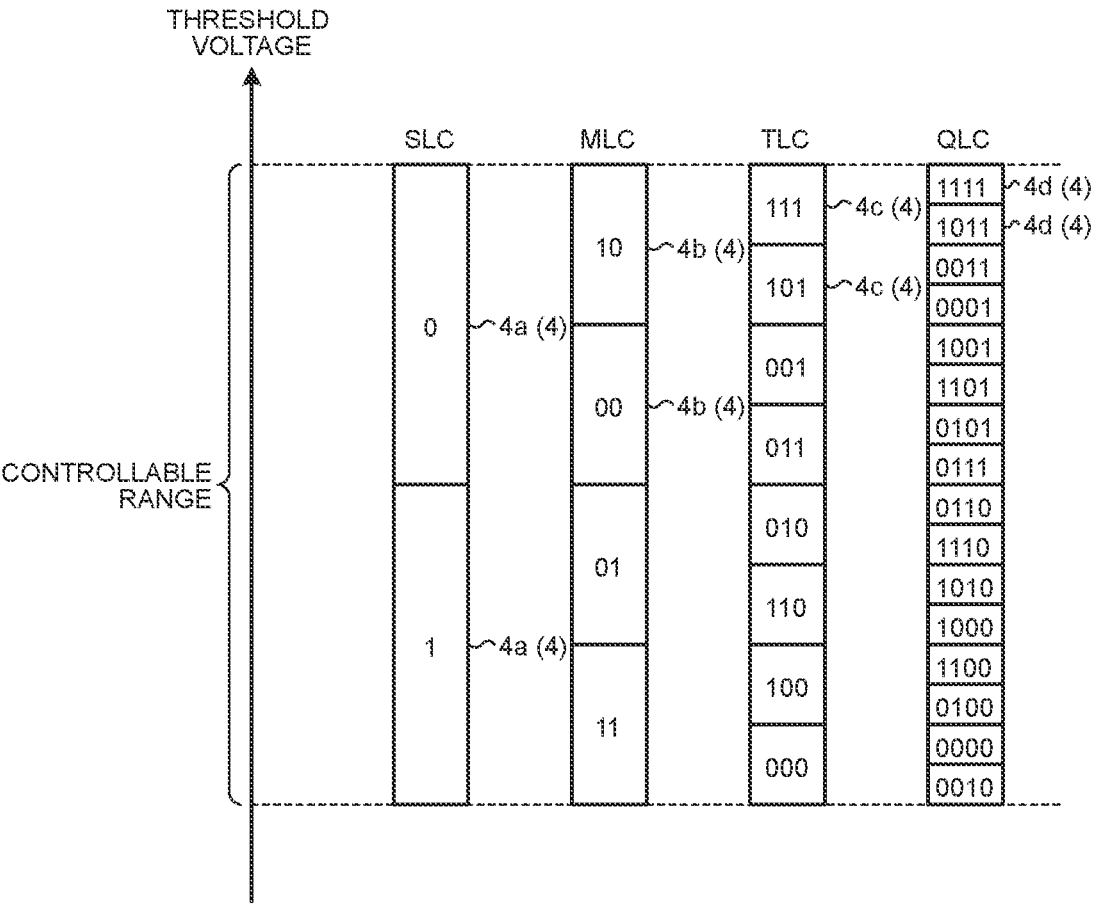
FIG. 4 is a diagram for describing sections in each case of an SLC mode, an MLC mode, a TLC mode, and a QLC mode, according to the embodiment.

FIG. 4 is a diagram for describing the sections in each case of the SLC mode, the MLC mode, the TLC mode, and the QLC mode, according to the embodiment. As illustrated in FIG. 4, the range of threshold voltage (controllable range) is divided into a plurality of sections 4.

For example, in the SLC mode, the range of threshold voltage is divided into two sections 4a. In the MLC mode, the range of threshold voltage is divided into four sections 4b. In the TLC mode, the range of threshold voltage is divided into eight sections 4c. In the QLC mode, the range of threshold voltage is divided into sixteen sections 4d.

As the number of bits of a value stored in one memory cell transistor MT is larger, the range of each section 4 is narrower. A value of the corresponding number of bits is assigned to each section 4. In the SLC mode, "0" is assigned to a section 4a on the high-voltage side, and "1" is assigned to a section 4a on the low-voltage side. In the MLC mode, "10", "00", "01", and "11" are assigned to the four sections 4b in descending order of voltage. In the TLC mode, "111", "101", "001", "011", "010", "110", "100", and "000" are assigned to the eight sections 4c in descending order of voltage. In the QLC mode, "1111", "1011", "0011", "0001", "1001", "1101", "0101", "0111", "0110", "1110", "1010", "1000", "1100", "0100", "0000", and "0010" are assigned to the sixteen sections 4d in descending order of voltage. Note that the rule of assigning values to each section 4 is not limited to these examples.

In the program operation, the peripheral circuit 210 selects a bit line BL corresponding to a column address. The peripheral circuit 210 sets the potential of the selected bit line BL to 0. The peripheral circuit 210 selects a word line WL corresponding to a row address and applies a programming pulse to the selected word line WL. Then, charges are injected into the charge storage layer of a memory cell transistor MT located at an intersection with the selected bit line BL and the selected word line WL, and as a result, the threshold voltage of the memory cell transistor MT increases. The peripheral circuit 210 checks whether or not the threshold voltage has reached a target section 4 corresponding to write data at a predetermined timing. The peripheral circuit 210 continues to apply a program pulse until the threshold voltage of the memory cell transistor MT reaches the target section 4.

In the sense operation, the peripheral circuit 210 decides a section 4 to which the threshold voltage of individual memory cell transistor MT included in a memory cell group MCG of a read destination belongs, and outputs values assigned to the decided section 4 as read data.

In the erase operation, the peripheral circuit 210 applies an erase voltage to a substrate of the memory cell array 211. Then, the peripheral circuit 210 causes all the word lines WL of an erase-target block BLK to be conducted to a ground potential. Then, charges stored in the charge storage layers in the memory cell transistors MT in the selected block BLK are discharged. As a result, the state of each memory cell transistor MT in the selected block BLK transitions to a state where data is deemed to be erased (that is, the section 4 on the lowest voltage side).

The memory system 1 is capable of setting or changing the storage mode. More specifically, the memory controller 11 can execute the write operation to the NAND memory 12 in either one of a first mode in which data containing a first number of bits is stored in each memory cell transistor MT or a second mode in which data containing a second number of bits (note that the second number is larger than the first number) is stored in each memory cell transistor MT.

The memory controller 11 basically writes write data received from the host 2 to the NAND memory 12 in the second mode in order to reduce the bit cost. However, as the number of bits of data stored per memory cell transistor MT increases, the time required for the write operation per data amount and the power consumption increase. Thus, in a case, such as the PLP operation, where only a limited amount of power can be used, the memory controller 11 executes the write operation in the first mode in order to reduce the power consumption.

The following description assumes that the first mode is the SLC mode and that the second mode is the TLC mode. The program operation in the SLC mode is an example of a first program operation. The program operation in the TLC mode is an example of a second program operation. Note that each of the first mode and the second mode is not limited to this example. Further, a memory cell transistor MT is also referred to as a memory cell.

Figure 5:
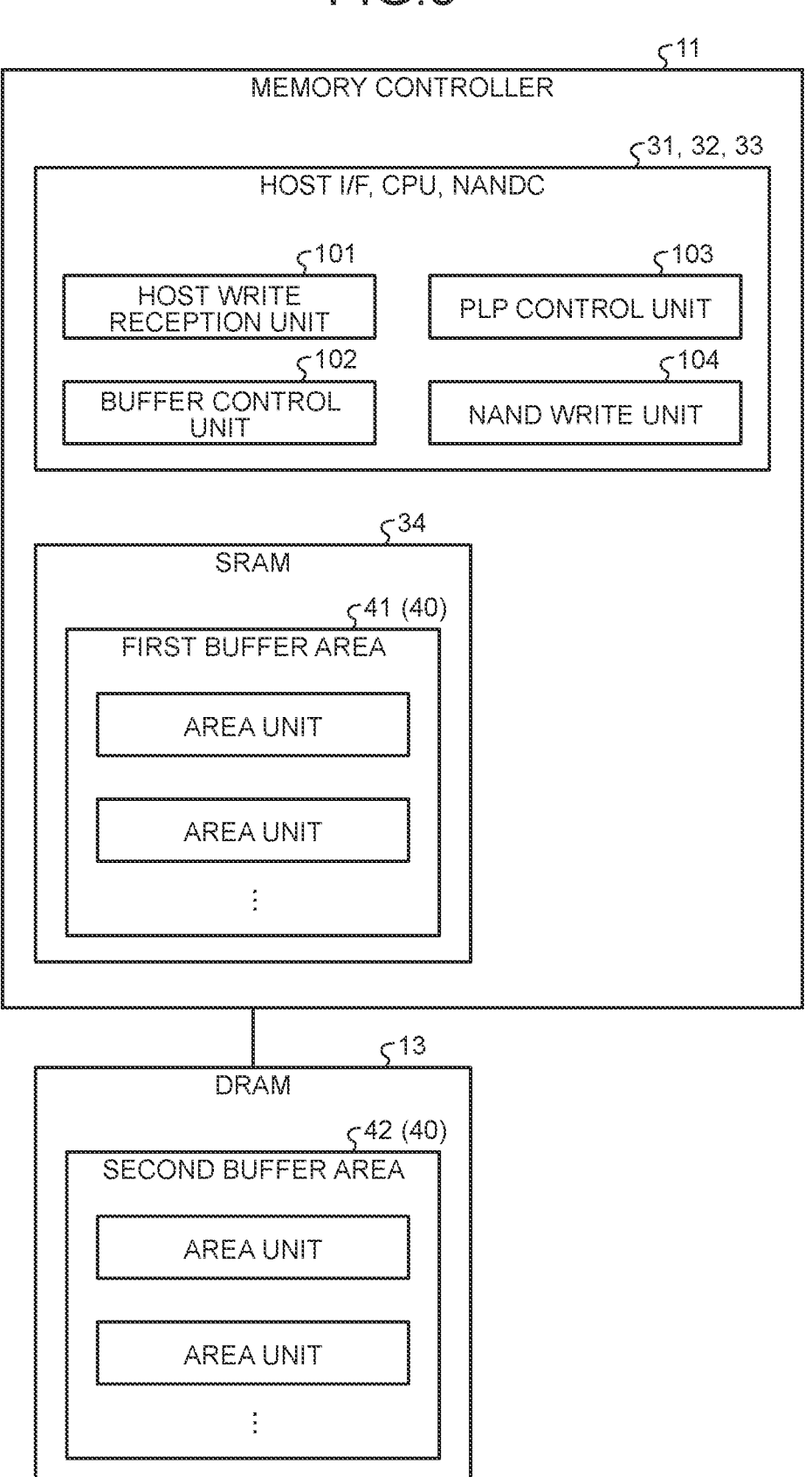
FIG. 5 is a schematic diagram illustrating an example of the functional configuration of a memory controller of the embodiment.

FIG. 5 is a schematic diagram illustrating an example of the functional configuration of the memory controller 11 of the embodiment.

The memory controller 11 functions as a host write reception unit 101, a buffer control unit 102, a PLP control unit 103, and a NAND write unit 104 by cooperation of some of or all the host I/F 31, the two NANDCs 32, and the CPU 33.

Each of the SRAM 34 and the DRAM 13 includes a buffer area in which write data received from the host 2 is buffered. The buffer area included in the SRAM 34 is referred to as a first buffer area 41, and the buffer area included in the DRAM 13 is referred to as a second buffer area 42. The first buffer area 41 and the second buffer area 42 may be collectively referred to as a buffer area 40.

The host write reception unit 101 receives a write request from the host 2 and stores data (write data), for which the write operation is requested by the write request, in the first buffer area 41 or the second buffer area 42.

The buffer control unit 102 controls the first buffer area 41 and the second buffer area 42. In the first buffer area 41 and the second buffer area 42, write data is stored per write unit with respect to the NAND memory 12.

The write unit is, for example, a unit of the program operation and is equal to the page size. Note that the write unit may be a size of a plurality of pages. In a case where the program operation is performed in the TLC mode, three pages, which is the size of data to be written in one memory cell group MCG, may be used as the write unit. Data with a size of the write unit is referred to as data unit.

Upon receiving the write request, the host write reception unit 101 requests the buffer control unit 102 to allocate an area of the buffer area 40 (hereinafter, referred to as an area unit) having a size of the write unit. The buffer control unit 102 allocates one or more area units in response to the request from the host write reception unit 101. The host write reception unit 101 stores write data from the host 2 in the one or more allocated area units.

The buffer control unit 102 deallocates an area unit storing a data unit for which the data-in operation or the program operation to the NAND memory 12 has been completed.

The buffer control unit 102 is capable of executing two types of control as deallocation control. Details of the two types of deallocation control and switching between the two types of deallocation control will be described later.

The NAND write unit 104 controls an operation of writing data stored in each area unit allocated in the buffer area 40 to the NAND memory 12. The NAND write unit 104 controls the write operation to the NAND memory 12 in a period during which power loss is not detected.

The PLP control unit 103 performs the PLP operation in response to a power loss signal. That is, the PLP control unit 103 controls the write operation to the NAND memory 12 in a period after power loss is detected.

In the NAND memory 12, the progress of the program operation may be delayed for some reason. For example, in a program operation on each data unit, when the number of memory cells, each of whose threshold voltage cannot be set to a value of the target section 4, exceeds a predetermined number, the program operation is determined to have failed. In this case, the program operation on the data unit is executed again. The progress of the program operation may be delayed by retry of the program operation or the like accordingly.

When the progress of the program operation is delayed, the transfer rate of write data from the memory controller 11 to the NAND memory 12 drops. When the transfer rate of the write data from the memory controller 11 to the NAND memory 12 drops below the transfer rate of the write data from the host 2 to the memory controller 11, an average rate of deallocation of area units drops below an average rate of allocation of area units. Then, when areas that can be allocated area units in the first buffer area 41 and the second buffer area 42 are exhausted, it becomes difficult to receive new write data, which extremely deteriorates the latency to the write request from the host 2.

Considering the above, in a case where the buffer usage, namely, the total amount of the sizes of allocated area units in the buffer area 40, exceeds a predetermined threshold value, the memory controller 11 intentionally limits the transfer rate of the write data from the host 2 to the memory controller 11 to a non-zero value. This avoids an extreme increase in the latency to the write request from the host 2.

Hereinafter, the transfer rate of write data from the host 2 to the memory controller 11 is referred to as a host transfer rate. The transfer rate from the memory controller 11 to the NAND memory 12 is referred to as a memory transfer rate.

Figure 6:
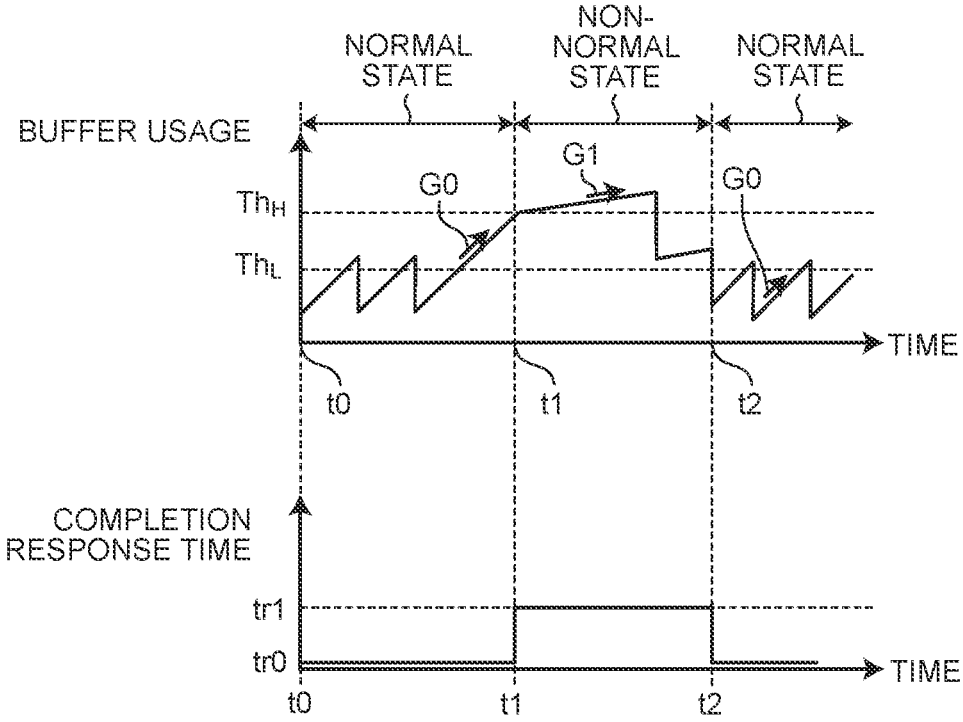
FIG. 6 is a graph for describing an example of changes in a buffer usage and an example of control of a host transfer rate in accordance with the buffer usage, according to the embodiment.

FIG. 6 is a graph for describing an example of changes in the buffer usage and an example of control of the host transfer rate in accordance with the buffer usage of the embodiment.

A graph drawn in the upper part of FIG. 6 illustrates an example of temporal transition of the buffer usage. A graph drawn in the lower part illustrates an example of a temporal transition of a completion response time, namely, a time from reception of a write request to transmission of a response of completion (referred to as a completion response) to the write request to the host 2. The following description assumes that the completion response is transmitted to the host 2 before the write operation of write data to the NAND memory 12 is not completed after the write data is completely stored in the buffer area 40.

As an example of the threshold value to be compared with the buffer usage, a threshold value $Th_H$ and a threshold value $Th_L$ are used. The threshold value $Th_L$ is smaller than the threshold value $Th_H$. The threshold value $Th_L$ is an example of a first threshold value. The threshold value $Th_H$ is an example of a second threshold value.

From a timing $t_0$ to a timing $t_1$, the buffer usage increases at, for example, a speed corresponding to a gradient G0 within a range not exceeding the threshold value $Th_H$ or rapidly decreases due to deallocation. The host write reception unit 101 transfers a completion response to the host 2 when storage of the write data in the buffer area 40 is completed. Therefore, the completion response time is a quite short time of tr0.

At the timing t1, the buffer usage exceeds the threshold value $Th_H$. The host write reception unit 101 refrains from transmitting the completion response for a while even after the storage of the write data in the buffer area 40 is completed and then transmits the completion response to the host 2 when a predetermined period of time has elapsed since the reception of the write request. Therefore, the completion response time becomes a time tr1 which is longer than the time tr0.

The host 2 is configured to request the memory system 1 to perform a next operation in response to a completion response. As described above, the completion response time is extended immediately after the timing t1. Thus, the frequency of transmission of a write request from the host 2 to the memory system 1 decreases. As a result, the host transfer rate decreases to a non-zero value. In addition, the rate of increase in the buffer usage is suppressed to, for example, a gradient G1 gentler than the gradient G0 in accordance with the decreased host transfer rate. This can prevent exhaustion of areas in the buffer area 40 to which allocation of area units is available.

From the timing t1 to a timing t2, the buffer usage increases at a speed indicated by the gradient G1 within a range not falling below the threshold value $Th_L$, or the buffer usage rapidly decreases due to deallocation.

At the timing t2, the buffer usage falls below the threshold value $Th_L$. The host write reception unit 101 transmits a completion response to the host 2 when storage of the write data in the buffer area 40 is completed. Then, the completion response time returns from the time tr1 to the quite short time tr0. Therefore, the buffer usage increases, for example, at a speed corresponding to the gradient G0 within a range not exceeding the threshold value $Th_H$, or rapidly decreases due to deallocation.

In this manner, the memory controller 11 limits the host transfer rate when the buffer usage exceeds the threshold value $Th_H$. This can avoid an extreme increase in the latency to a write request from the host 2 due to exhaustion of areas in the buffer area 40 to which allocation of area units is available.

A state where the buffer usage does not satisfy a condition for reducing the host transfer rate, such as a period until the timing t1 or a period after the timing t2, is referred to as a normal state, for example. A state where the buffer usage satisfies the condition for reducing the host transfer rate, such as a period from the timing t1 to the timing t2, is referred to as a non-normal state.

Note that a threshold value may be used in common for determination of a transition from the normal state to the non-normal state and determination of a transition from the non-normal state to the normal state. However, there may be a case where the buffer usage repeatedly fluctuates across the threshold value in a short time. In such a case, the frequency of transition between the normal state and the non-normal state increases.

In the example illustrated in FIG. 6, the threshold value $Th_H$ used for determination of a transition from the normal state to the non-normal state is larger than the threshold value $Th_L$ used for determination of a transition from the non-normal state to the normal state. By setting each threshold value in this manner, it is possible to reduce the frequency of transition between the normal state and the non-normal state.

Note that the threshold values (such Th$_H$ and Th$_L$) to be compared with the buffer usage can be set in any manner.

In one example, a value equal to the capacity of the first buffer area 41 is set as the threshold value Th$_H$. The buffer control unit 102 preferentially allocates area units to the first buffer area 41 included in the SRAM 34 rather than the second buffer area 42 included in the DRAM 13. Therefore, the buffer usage exceeding the threshold value Th$_H$ means that areas to which an area unit can be allocated are exhausted in the first buffer area 41 and that allocation of an area unit in the second buffer area 42 has started.

The second buffer area 42 is included in the DRAM 13 whose operation is slower than that of the SRAM 34. Therefore, data cannot be input to the second buffer area 42 at a high speed as the first buffer area 41. That is, the host transfer rate may be limited by the maximum rate of data transfer to the second buffer area 42. In this case, the throughput of the transfer of the write data from the host 2 to the memory system 1 decreases.

However, in a case where a value equal to the capacity of the first buffer area 41 is set as the threshold value Th$_H$, the second buffer area 42 is used only in the non-normal state, in which the host transfer rate is limited to a rate lower than that in the normal state. Therefore, decrease in the throughput due to the maximum rate of data transfer to the second buffer area 42 is not considered a problem.

Note that the threshold value Th$_H$ may not be equal to the capacity of the first buffer area 41.

Note that, in the example illustrated in FIG. 6, control to reduce the host transfer rate by increasing the completion response time is implemented. A method of reducing the host transfer rate is not limited to extending the completion response time.

Next, the two types of deallocation control by the buffer control unit 102 will be described. One of the two types of deallocation control is referred to as a first deallocation control, and the other is referred to as a second deallocation control.

FIG. 7 is a schematic diagram for describing the first deallocation control of the embodiment. An example of temporal transition of the buffer usage is illustrated in the lower part of the drawing. In the upper part, temporal transition of the operation status of the NAND memory 12 is illustrated. As the operation status of the NAND memory 12, a status of a write operation for each operating element (here, each memory chip CP) is illustrated. The operation status related to the write operation includes the data-in operation and the program operation.

For example, a data unit to be written to a predetermined word line WL of the memory chip CP0 is accumulated in one area unit at a timing t10, whereby the data-in operation with respect to the memory chip CP0 is started. When the data-in operation on the memory chip CP0 is completed at a timing t11, the buffer control unit 102 deallocates the area unit which has been allocated as the transfer source of the data-in operation. The buffer usage sharply drops by this deallocation.

At a timing t12, a data unit to be written to a predetermined word line WL of the memory chip CP1 is accumulated in one area unit, whereby the data-in operation of the data unit with respect to the memory chip CP1 is started. When the data-in operation on the memory chip CP1 is completed at a timing t13, the buffer control unit 102 deallocates the area unit which has been allocated as the transfer source of the data-in operation.

Similarly, the data-in operation on the memory chip CP2 is started at a timing t14. When the data-in operation on the memory chip CP2 is completed at a timing t15, the buffer control unit 102 deallocates the area unit which has been allocated as the transfer source of the data-in operation.

Further similarly, the data-in operation on the memory chip CP3 is started at a timing t16. When the data-in operation on the memory chip CP3 is completed at a timing t17, the buffer control unit 102 deallocates the area unit which has been allocated as the transfer source of the data-in operation.

As described above, in the first deallocation control, at a time when a data-in operation is completed, deallocation is executed on an area unit storing a data unit for which the data-in operation has been completed.

As described above, the memory controller 11 basically writes data to the NAND memory 12 in the TLC mode. Then, during the PLP operation, the memory controller 11 writes data to the NAND memory 12 in the SLC mode in which the time required for the write operation per data amount is shorter and the power consumption is smaller than those in the TLC mode.

However, according to the first deallocation control, a data unit for which the data-in operation has already been completed cannot be re-acquired from the buffer area 40 even when the program operation of the data unit has not yet been completed. Thus, for a data unit for which the program operation in the TLC mode is being executed when the PLP operation is started, the program operation of the data unit in the TLC mode is continued until the program operation is completed.

Thereafter, in a case where a data unit for which the program operation has not been completed remains in an area unit, that is, for a data unit for which the data-in operation has not been completed, the PLP control unit 103 writes the data unit in the NAND memory 12 in the SLC mode. That is, the PLP control unit 103 performs the data-in operation on the data unit and then executes the program operation in the SLC mode.

In the example illustrated in FIG. 7, the PLP operation is started (in other words, power loss is detected) at a timing t18. In this case, for each data unit for which the data-in operation has been completed between the timing t10 to the timing t18, the program operation in the TLC mode is started after the data-in operation. Moreover, at the time point of starting the PLP operation (namely, the timing t18), the program operation in the TLC mode is being executed in the memory chip CP2 and the memory chip CP3. Therefore, the PLP control unit 103 causes the memory chip CP2 and the memory chip CP3 to continue the program operation in the TLC mode.

At a timing t19, the program operation in the TLC mode is completed for all the memory chips CP. Then, the PLP control unit 103 starts the write operation in the SLC mode for all the data remaining in the buffer area 40. In this example, the PLP control unit 103 starts, at the timing 19, the data-in operation of data present in an area unit at the timing t18 and executes the program operation in the SLC mode when the data-in operation is completed at a timing t20. When there is no more data in the buffer area 40 that has not yet been written to the NAND memory 12, the PLP operation is completed at a timing t21.

Figure 8:
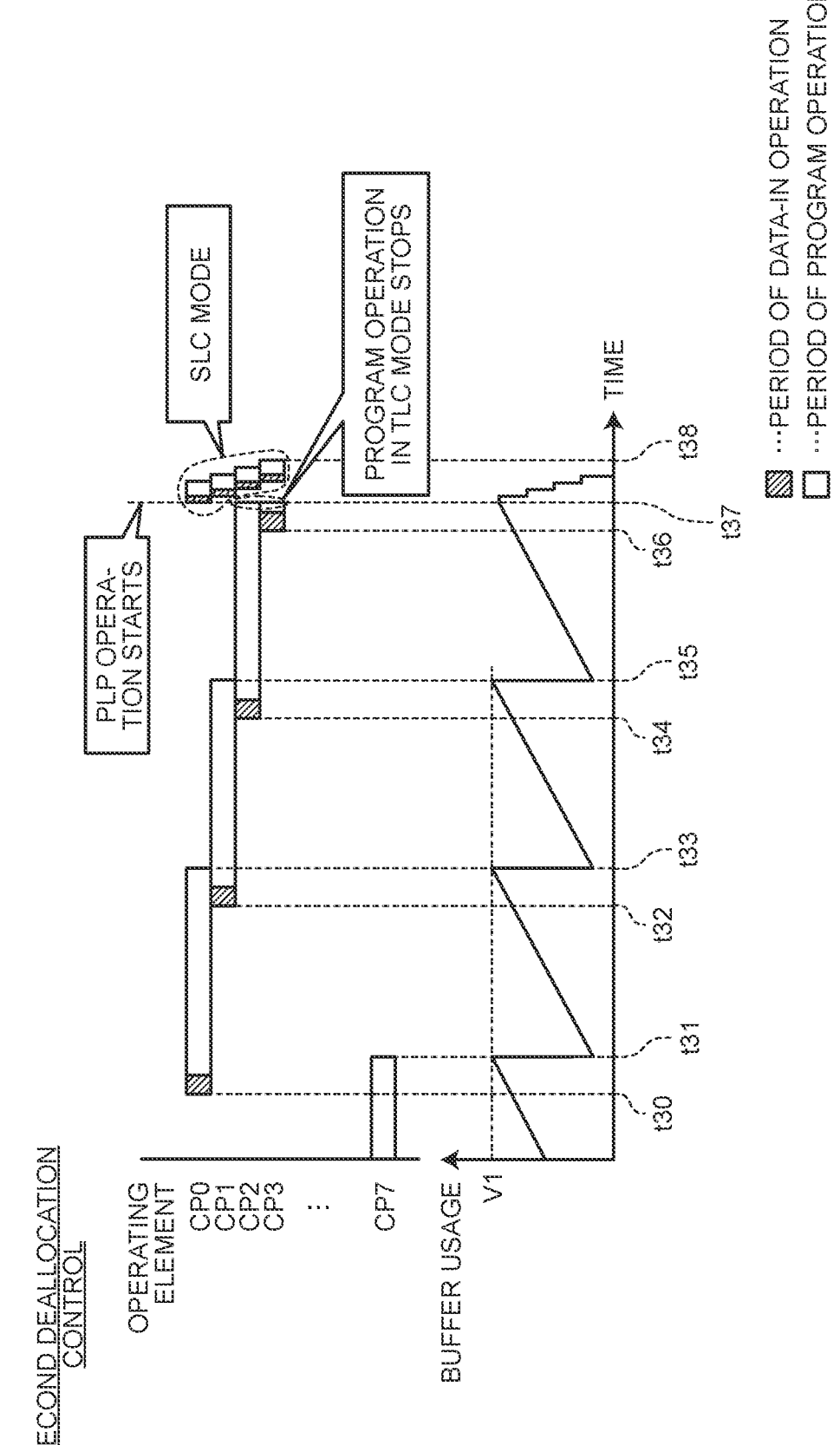
FIG. 8 is a schematic diagram for describing a second deallocation control of the embodiment.

FIG. 8 is a schematic diagram for describing the second deallocation control of the embodiment. Similarly to FIG. 7, an example of temporal transition of the buffer usage is illustrated in the lower part of the drawing. In the upper part, temporal transition of the operation status of the NAND memory 12 is illustrated.

For example, at a timing t30, a program operation in the TLC mode is being executed in the memory chip CP7. At the timing t30, a data unit to be written to a predetermined word line WL of the memory chip CP0 is accumulated in one area unit, whereby the data-in operation of the data unit with respect to the memory chip CP0 is started. After the data-in operation, the program operation in the TLC mode is started.

When the program operation in the memory chip CP7 is completed at a timing t31, the buffer control unit 102 deallocates the area unit storing the data unit for which the program operation has been completed. The buffer usage sharply drops by this deallocation.

At a timing t32, a data unit to be written to a predetermined word line WL of the memory chip CP1 is accumulated in one area unit, whereby the data-in operation of the data unit with respect to the memory chip CP1 is started. After the data-in operation, the program operation in the TLC mode is started.

When the program operation in the memory chip CP0 is completed at a timing t33, the buffer control unit 102 deallocates the area unit storing the data unit for which the program operation has been completed. The buffer usage sharply drops by this deallocation.

At a timing t34, a data unit to be written to a predetermined word line WL of the memory chip CP2 is accumulated in one area unit, whereby the data-in operation of the data unit with respect to the memory chip CP2 is started. After the data-in operation, the program operation in the TLC mode is started.

When the program operation in the memory chip CP1 is completed at a timing t35, the buffer control unit 102 deallocates the area unit storing the data unit for which the program operation has been completed. The buffer usage sharply drops by this deallocation.

At a timing t36, a data unit to be written to a predetermined word line WL of the memory chip CP3 is accumulated in one area unit, whereby the data-in operation of the data unit with respect to the memory chip CP3 is started. After the data-in operation, the program operation in the TLC mode is started.

As described above, in the second deallocation control, deallocation of an area unit storing a data unit is executed when the program operation of the data unit is completed.

In the second deallocation control, for a data unit for which the program operation in the TLC mode is being executed at the timing when the PLP operation is started, the program operation of the data unit in the TLC mode is stopped. Moreover, the PLP control unit 103 writes the data unit remaining in an area unit to the NAND memory 12 in the SLC mode.

In the example illustrated in FIG. 8, the PLP operation is started at a timing t37. At the start of the PLP operation, the program operation in the TLC mode is being executed in the memory chip CP2 and the memory chip CP3. The PLP control unit 103 then causes the memory chip CP2 and the memory chip CP3 to stop the program operation in the TLC mode that is being executed. After that, the PLP control unit 103 performs the data-in operation of all the data in the buffer area 40 including two data units for which program operation in the TLC mode has been stopped and sequentially executes the program operation in the SLC mode for the data for which the data-in operation has been completed. In the example illustrated in FIG. 8, after the timing t37, the data-in operation and the program operation in the SLC mode are performed on each of the memory chips CP0 to CP3.

According to the second deallocation control, a period from allocation of an area unit to deallocation of the area unit is longer than that in the first deallocation control. Therefore, in the second deallocation control, the buffer usage tends to be slightly larger than that in the first deallocation control. For example, the maximum value V1 of the buffer usage under the second deallocation control illustrated in FIG. 8 is larger than the maximum value V0 of the buffer usage under the first deallocation control illustrated in FIG. 7.

However, according to the second deallocation control, when the PLP operation is started, the program operation in the TLC mode is stopped, and all the data in the buffer area 40, including a data unit for which the program operation in the TLC mode has been stopped, is written to the NAND memory 12 in the SLC mode. In the SLC mode, the time required for the write operation per data amount is shorter and the power consumption is also smaller than those in the TLC mode. Therefore, according to the second deallocation control, the time required for the PLP operation is shorter and the amount of power required for the PLP operation is smaller than those under the first deallocation control. For example, in the operation example under the first deallocation control illustrated in FIG. 7, the PLP operation is executed in a period from the timing t18 to the timing t21. Meanwhile, in the operation example under the second deallocation control illustrated in FIG. 8, the PLP operation is executed in a period from the timing t37 to a timing t38, which is shorter than the period from the timing t18 to the timing t21.

In the embodiment, for each area unit, the memory controller 11 executes the first deallocation control when the state of the buffer usage at a predetermined determination timing is the normal state and executes the second deallocation control when the state of the buffer usage at the determination timing is the non-normal state.

Therefore, even when the buffer usage increases and the state of the buffer usage becomes the non-normal state, the power consumption necessary for the PLP operation can be reduced by stopping the program operation in the TLC mode. In addition, since the buffer usage is originally small in the normal state, the power consumption necessary for the PLP operation in the normal state is small.

In short, according to the embodiment, the power consumption necessary for the PLP operation can be made small in both the case where the buffer usage is large and the case where the buffer usage is small. As a result, it is not necessary to mount a capacitor with a large capacity in the memory system, and the cost of the memory system can be suppressed.

Note that, in the embodiment, the deallocation control is selected in accordance with the state of the buffer usage at the predetermined determination timing. The predetermined determination timing is, for example, a timing at which the data-in operation is completed.

Next, an operation of the memory system 1 of the embodiment will be described.

Figure 9:
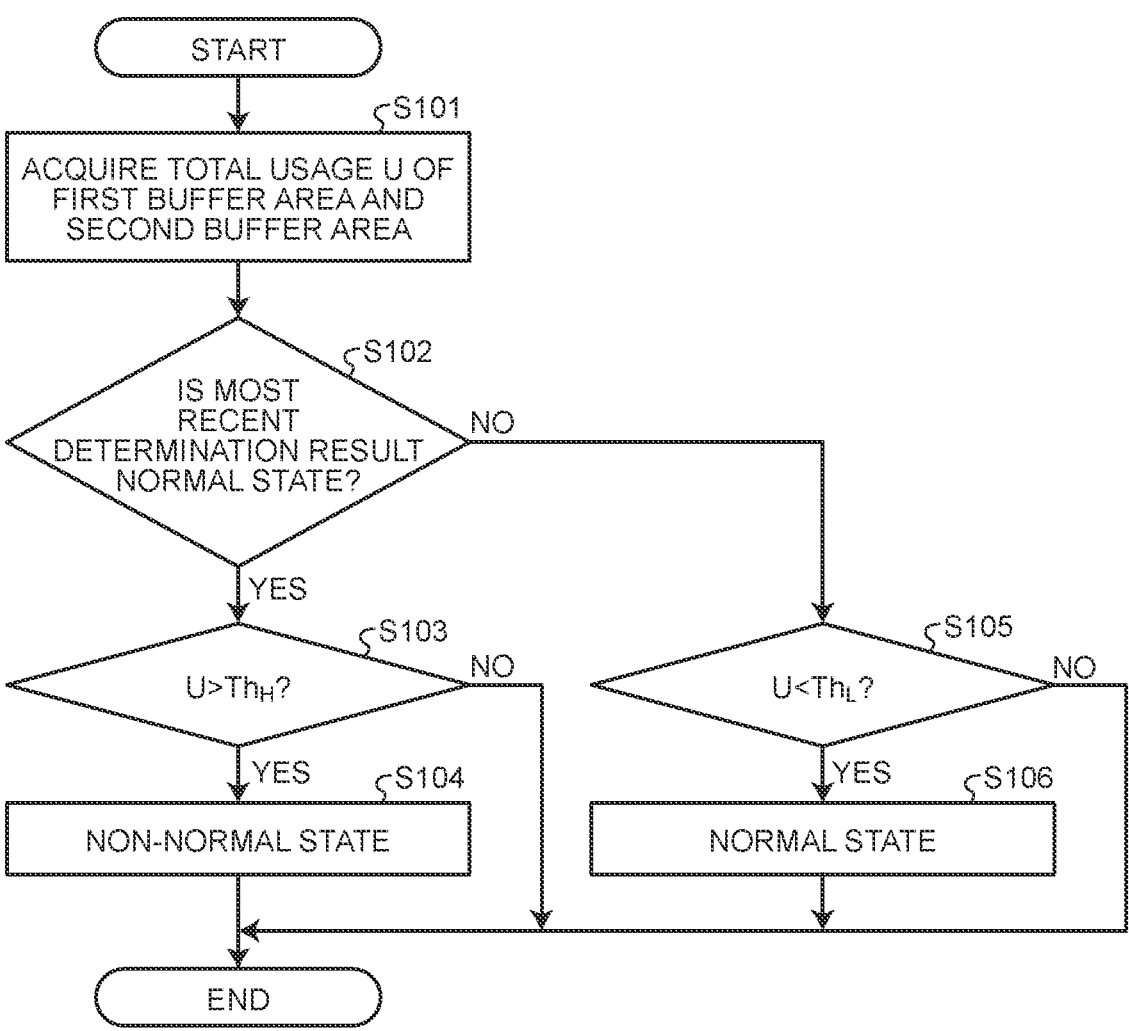
FIG. 9 is a flowchart illustrating an example of an operation of the embodiment for determining a state of the buffer usage.

FIG. 9 is a flowchart illustrating an example of an operation of the embodiment for determining a state of the buffer usage. The operation illustrated in this drawing is referred to as a state determination operation. The state determination operation is executed by the buffer control unit 102, for example. The state determination operation is executed at different timings. The state determination operation may be executed at a predetermined time period or may be executed when a predetermined operation, for example, an operation of allocating or deallocating an area unit.

The buffer control unit 102 acquires a total usage U of the first buffer area 41 and the second buffer area 42 (S101). Then, the buffer control unit 102 determines whether or not the most recent determination result indicates the normal state (S102).

When the most recent determination result indicates the normal state (S102: Yes), the buffer control unit 102 determines whether or not the usage U exceeds the threshold value $Th_H$ (S103). When the usage U exceeds the threshold value $Th_H$ (S103: Yes), the buffer control unit 102 makes a decision that the current state of the buffer usage is the non-normal state (S104).

When the most recent determination result does not indicate the normal state (S102: No), namely, the result indicates the non-normal state, the buffer control unit 102 determines whether or not the usage U is below the threshold value $Th_L$ (S105). When the usage U is below the threshold value $Th_L$ (S105: Yes), the buffer control unit 102 makes a decision that the current state of the buffer usage is the normal state (S106).

The state determination operation ends when the usage U does not exceed the threshold value $Th_H$ (S103: No), or after the processing of step S104, or when the usage U does not fall below the threshold value $Th_L$ (S105: No), or after the processing of step S106.

By repeatedly executing the series of operations illustrated in FIG. 9 at short intervals, the state of the buffer usage is recognized as the normal state from when the usage of the buffer area 40 falls below the threshold value $Th_L$ to when the usage of the buffer area 40 exceeds the threshold value $Th_H$, and the state of the buffer usage is recognized as the non-normal state from when the usage of the buffer area 40 exceeds the threshold value $Th_H$ to when the usage of the buffer area 40 falls below the threshold value $Th_L$.

Note that processing in a case where the usage U is equal to the threshold value $Th_H$ in the determination processing of step S103 or in a case where the usage U is equal to the threshold value Th in the determination processing of step S105 is not limited to the above example. For example, in a case where the usage U is equal to the threshold value $Th_H$ in the determination processing of step S103, the processing of step S104 may be executed. In a case where the usage U is equal to the threshold value $Th_L$ in the determination processing of step S105, the processing of step S106 may be executed.

Figure 10:
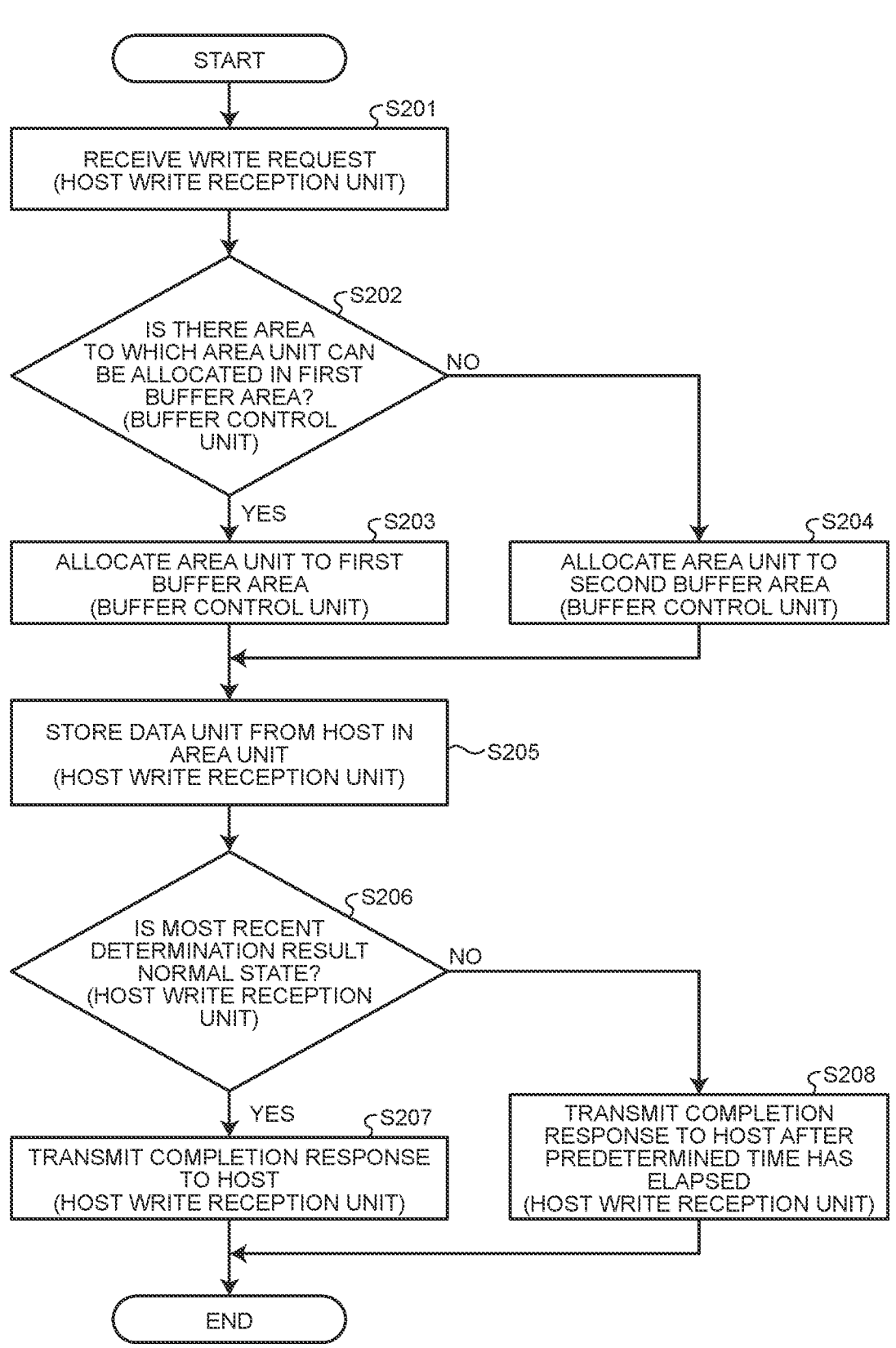
FIG. 10 is a flowchart illustrating an example of an operation when the memory system of the embodiment receives a write request from a host.

FIG. 10 is a flowchart illustrating an example of operation when the memory system 1 of the embodiment receives a write request from the host 2.

When the host write reception unit 101 receives the write request (S201), the buffer control unit 102 first determines whether or not there is an area to which an area unit can be allocated in the first buffer area 41 (S202).

For example, upon receiving the write request, the host write reception unit 101 requests the buffer control unit 102 to allocate an area unit for each data unit included in write data subjected to the write request. The buffer control unit 102 decides a buffer area for allocating one or more area units requested from the host write reception unit 101. The buffer control unit 102 decides a buffer area for allocation for each area unit on the basis of whether or not there is a free space, namely, an area to which an area unit can be allocated in the first buffer area 41. In order to simplify the description, the following description assumes that the write data is constituted by one data unit and that allocation of one area unit is requested for buffering the one data unit. Note that, in a case where allocation of two or more area units is requested, the processing of steps S202 to S205 are executed for each of the area units for which the allocation has been requested.

When there is an area to which an area unit can be allocated in the first buffer area 41 (S202: Yes), the buffer control unit 102 allocates the area unit to the first buffer area 41 (S203). When there is no area to which an area unit can be allocated in the first buffer area 41 (S202: No), the buffer control unit 102 allocates the area unit to the second buffer area 42 (S204).

After the processing of step S203 or the processing of step S204, the host write reception unit 101 receives write data from the host 2 and stores a data unit which is the received write data in the allocated area unit (S205).

Then, the host write reception unit 101 determines whether or not the most recent determination result by the state determination operation indicates the normal state (S206). For example, the host write reception unit 101 inquires the buffer control unit 102 about the most recent determination result. Note that the method of determining whether or not the most recent determination result is the normal state is not limited.

When the most recent determination result by the state determination operation indicates the normal state (S206: Yes), the host write reception unit 101 transmits a completion response to the host 2 (S207). When the most recent determination result by the state determination operation does not indicate the normal state (S206: No), namely, the most recent determination result indicates the non-normal state, the host write reception unit 101 waits for an elapse of a predetermined time so that an elapsed time from the reception of the write request becomes longer and then transmits the completion response to the host 2 (S208).

After the processing of step S207 or the processing of step S208, the operation performed when the write request is received ends.

Figure 11:
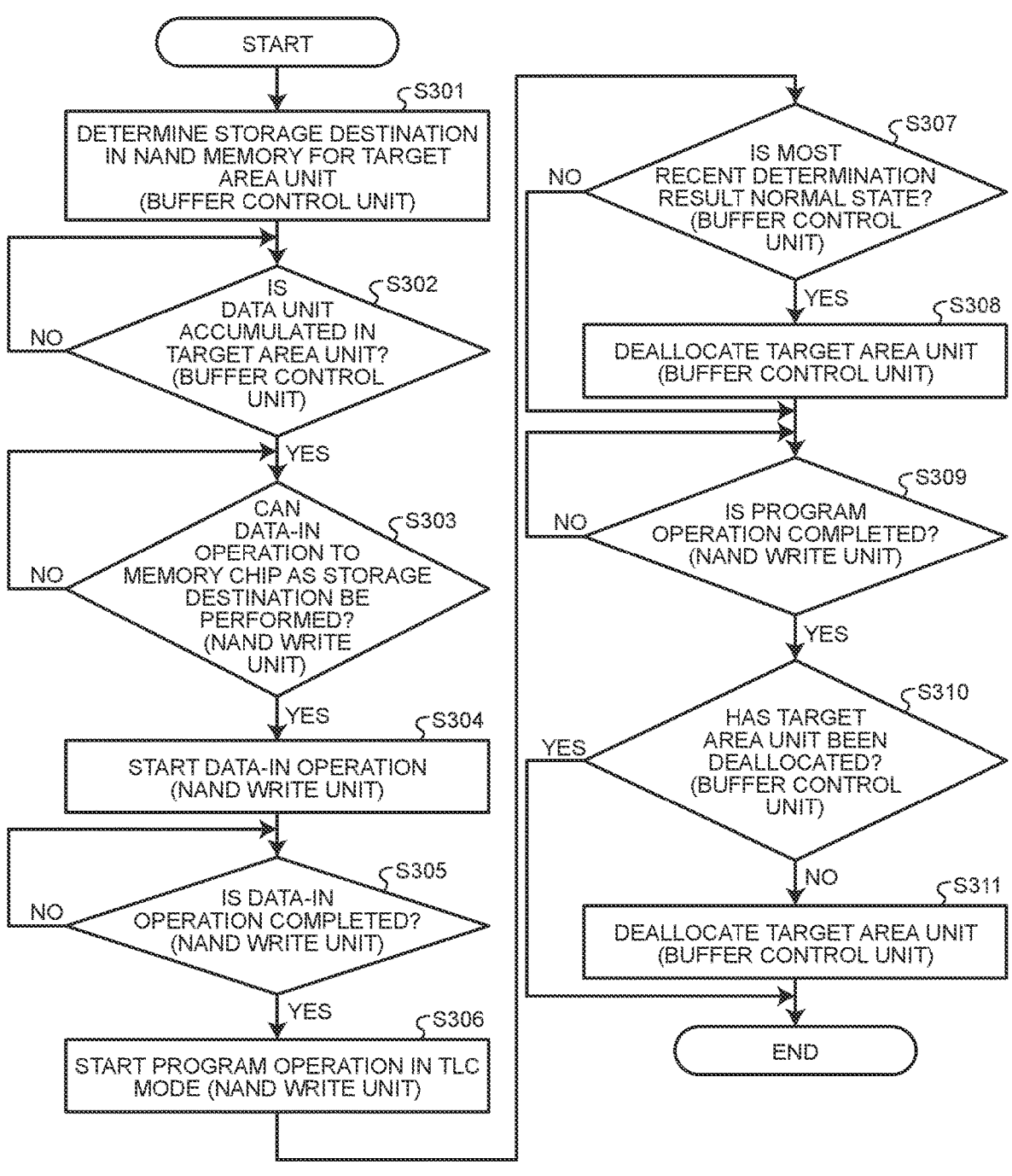
FIG. 11 is a flowchart illustrating an example of a write operation to a NAND memory in a period during which power loss is not detected in the memory system of the embodiment.

FIG. 11 is a flowchart illustrating an example of the write operation to the NAND memory 12 in a period during which power loss is not detected in the memory system 1 of the embodiment. An operation related to an allocated one area unit (referred to as a target area unit) will be described. Note that in a case where two or more area units are allocated, the operation illustrated in the drawing is executed for each of the allocated area units.

The buffer control unit 102 decides a storage destination of a data unit in the NAND memory 12 for a target area unit (S301). Then, the buffer control unit 102 determines whether or not the data unit is accumulated in the target area unit (S302).

When the data unit is not accumulated in the target area unit (S302: No), the processing of step S302 is executed again.

When the data unit is accumulated in the target area unit (S302: Yes), the NAND write unit 104 determines whether or not the data-in operation to the memory chip CP, which is decided to be a storage destination, can be performed (S303).

More specifically, in a case where the data unit is accumulated in the target area unit, the buffer control unit 102 requests the NAND write unit 104 to write the data unit in the target area unit to the NAND memory 12. The NAND write unit 104 stores one or more received requests in a queue or the like and sequentially processes the received requests. The NAND write unit 104 monitors whether or not the channels CH0 and CH1 are available and whether or not each of the memory chips CP can accept a new command. The determination on whether or not each of the memory chips CP can accept a new command is performed by monitoring a ready/busy signal, for example. The NAND write unit 104 makes a decision that the data-in operation to a memory chip CP as a storage destination can be performed when the execution order of the request for the write operation to the memory chip CP comes, a channel to which the memory chip CP is connected is available, and the memory chip CP can accept a new command. The NAND write unit 104 makes a decision that the data-in operation to a memory chip CP as a storage destination is not possible when the execution order of the request for the write operation to the memory chip CP has not come yet, the channel to which the memory chip CP is connected is not available, or the memory chip CP cannot accept a new command. Note that the method of determining whether or not the data-in operation to the memory chip CP as the storage destination can be performed is not limited to the above.

When the data-in operation to the memory chip CP as the storage destination cannot be performed (S303: No), the processing of step S303 is executed again.

When the data-in operation to the memory chip CP as the storage destination can be performed (S303: Yes), the NAND write unit 104 starts the data-in operation of the data unit in the target area unit (S304).

The NAND write unit 104 determines whether or not the data-in operation of the data unit in the target area unit is completed (S305). The determination on whether or not the data-in operation of the data unit in the target area unit is completed is performed on the basis of, for example, the data amount transferred to the memory chip CP by the data-in operation.

When the data-in operation of the data unit in the target area unit is not completed (S305: No), the processing of step S305 is executed again.

When the data-in operation of the data unit in the target area unit is completed (S305: Yes), the NAND write unit 104 causes the memory chip CP as the storage destination to start the program operation (S306). This program operation is executed in the TLC mode.

The buffer control unit 102 is also notified, from the NAND write unit 104, that the data-in operation of the data unit in the target area unit has been completed. The buffer control unit 102 that has received the notification determines whether or not the most recent determination result by the state determination operation indicates the normal state (S307).

When the most recent determination result by the state determination operation indicates the normal state (S307: Yes), the buffer control unit 102 deallocates the target area unit (S308). The control of deallocating the target area unit at this timing corresponds to the first deallocation control.

During and after the processing of step S307 and the processing of step S308 are executed by the buffer control unit 102, the NAND write unit 104 monitors the progress of the program operation started in the processing of step S306. The NAND write unit 104 then determines whether or not the program operation is completed (S309). When the program operation is not completed (S309: No), the NAND write unit 104 executes the processing of step S309 again.

When the program operation is completed (S309: Yes), the buffer control unit 102 is notified of the completion of the program operation from the NAND write unit 104. The buffer control unit 102 determines whether or not the target area unit has been deallocated (S310).

When the target area unit has not been deallocated (S310: No), the buffer control unit 102 deallocates the target area unit (S311). The control of deallocating the target area unit at this timing corresponds to the second deallocation control.

When the target area unit has been deallocated (S310: Yes), or after the processing of step S311, the write operation to the NAND memory 12 in the period during which the power loss is not detected ends.

Figure 12:
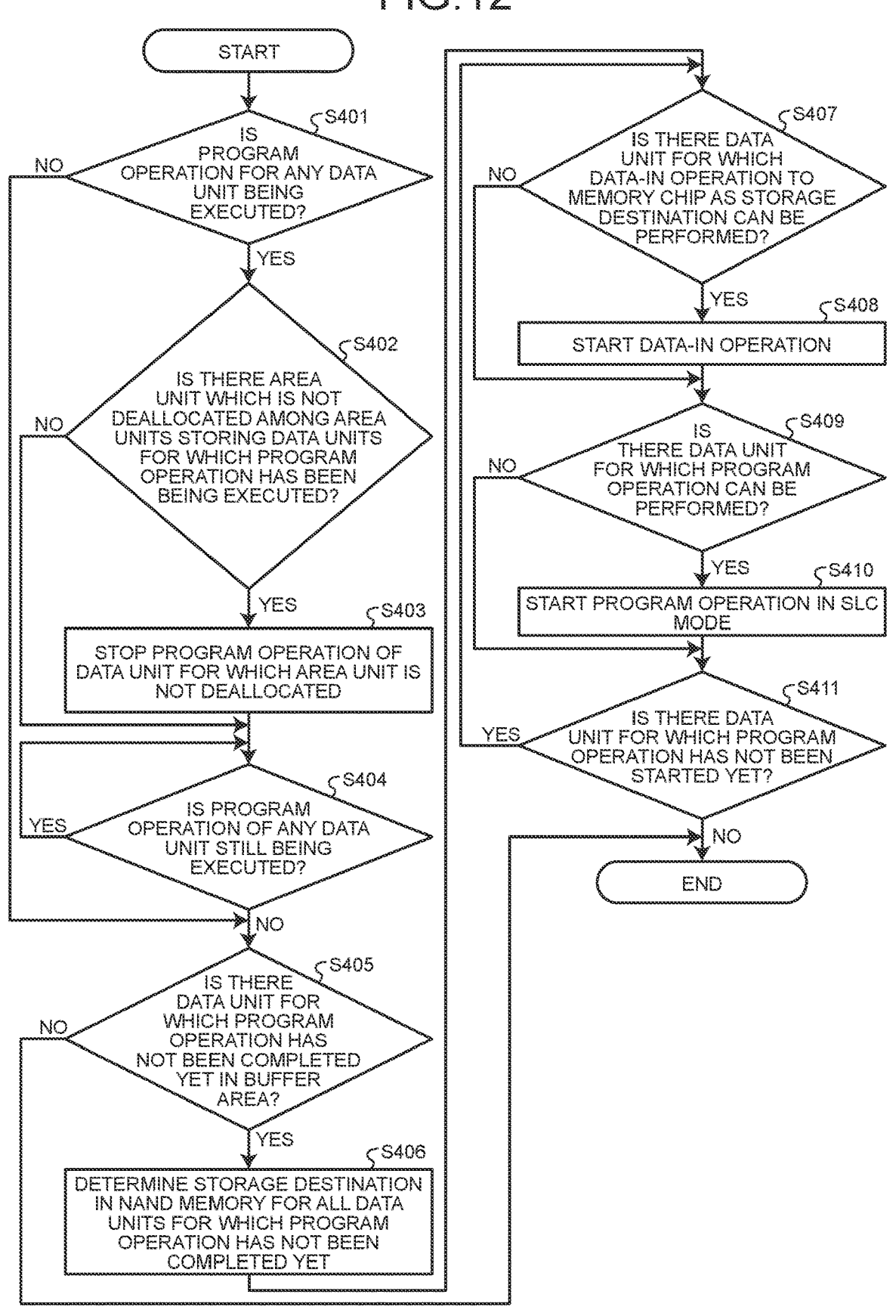
FIG. 12 is a flowchart illustrating an example of a write operation to the NAND memory when power loss is detected in the memory system of the embodiment.

FIG. 12 is a flowchart illustrating an example of the write operation to the NAND memory 12 when power loss is detected in the memory system 1 of the embodiment. That is, the operation illustrated in the drawing represents the PLP operation. When the power management IC 14 detects power loss, the power management IC 14 transmits a power loss signal to the memory controller 11. In the memory controller 11, the PLP control unit 103 starts control of the PLP operation illustrated in FIG. 12 in response to the power loss signal.

In the PLP operation, the PLP control unit 103 first determines whether or not the program operation of any data unit is being executed (S401). When the program operation of a data unit is being executed (S401: Yes), the PLP control unit 103 determines whether or not there is an area unit which is not deallocated among area units storing data units for which the program operation has been being executed (S402).

At a time point when the program operation is being executed, there are a case where the area unit has already been deallocated (see S308 in FIG. 11) and a case where the area unit has not yet been deallocated (see S311 in FIG. 11). In a case where the area unit has already been deallocated, re-acquisition of the data unit from the area unit is impossible, and thus it is necessary to complete the program operation. In a case where the area unit has not yet been deallocated, the program operation may be stopped. Whether an area unit storing a data unit for which the program operation has been being executed has already been deallocated or not may be different for each data unit. Therefore, in step S402, the PLP control unit 103 determines whether the area unit is deallocated or not for each of the data units for which the program operation is being executed. The PLP control unit 103 executes the processing of step S402, for example, by making an inquiry to the buffer control unit 102 or receiving a notification from the buffer control unit 102.

When there is a data unit for which an area unit is not deallocated (S402: Yes), the PLP control unit 103 stops the program operation of the data unit for which the area unit is not deallocated (S403).

When there is no data unit for which an area unit is not deallocated (S402: No) or after the processing of step S403, the PLP control unit 103 determines whether or not the program operation of any data unit is still being executed (S404).

When the program operation of any data unit is still being executed (S404: Yes), the processing of step S404 is executed again.

When there is no data unit for which the program operation is being executed (S401: No or S404: No), the PLP control unit 103 determines whether or not there is a data unit for which the program operation is not completed in the buffer area 40 (S405). When there is no data unit for which the program operation has not yet been completed in the buffer area 40 (S405: No), the write operation to the NAND memory 12 at the time when power loss is detected ends.

When there is a data unit for which the program operation has not yet been completed in the buffer area 40 (S405: Yes), the PLP control unit 103 writes the data unit for which the program operation has not yet been completed to the NAND memory 12 in the SLC mode. Note that, at the time of the determination processing in step S405, the data unit for which the program operation has not yet been completed is synonymous with a data unit stored in an area unit for which deallocation has not yet been performed. By the subsequent operation, the write operation in the SLC mode of all the data units stored in all the area units not yet deallocated is executed.

Specifically, first, the PLP control unit 103 decides a storage destination in the NAND memory 12 for all the data units for which the program operation has not yet been completed (S406). Then, the PLP control unit 103 determines whether or not there is a data unit for which the data-in operation to a memory chip CP as the storage destination can be performed (S407). In the processing of step S407, for example, whether or not there is a data unit for which the data-in operation to the memory chip CP as the storage destination can be performed on the basis of a determination criterion similar to the processing of step S303 illustrated in FIG. 11. Note that the determination criterion in the processing of step S407 is not limited to the above.

When there is a data unit for which the data-in operation to the memory chip CP as the storage destination can be performed (S407: Yes), the PLP control unit 103 starts the data-in operation of the data unit (S408).

When there is no data unit for which the data-in operation to the memory chip as the storage destination can be performed (S407: No) or after the processing of step S408, the PLP control unit 103 determines whether or not there is a data unit for which the program operation can be performed, namely, a data unit for which the data-in operation has been completed whereas the program operation has not been started yet (S409).

When there is a data unit for which the program operation can be performed (S409: Yes), the PLP control unit 103 causes the memory chip CP as a storage destination of the data unit to start the program operation (S410). This program operation is executed in the SLC mode.

When there is no data unit for which the program operation can be performed (S409: No) or after step S410, the PLP control unit 103 determines whether or not there is a data unit for which the program operation has not been started yet in the buffer area 40 (S411).

When there is a data unit for which the program operation has not been started yet in the buffer area 40 (S411: Yes), the processing of step S407 is executed again.

By repeating loop processing from step S407 to step S411, the write operation in the SLC mode to the NAND memory 12 is completed for all the data units remaining in the buffer area 40 at the time when the determination of Yes is made in the determination processing of step S405. In other words, the write operation in the SLC mode to the NAND memory 12 is completed for all the data units stored in all the area units not yet deallocated in the determination processing of step S405.

When there is no data unit for which the program operation has not yet been started in the buffer area 40 (S411: No), the write operation to the NAND memory 12 at the time when power loss is detected ends.

Figure 13:
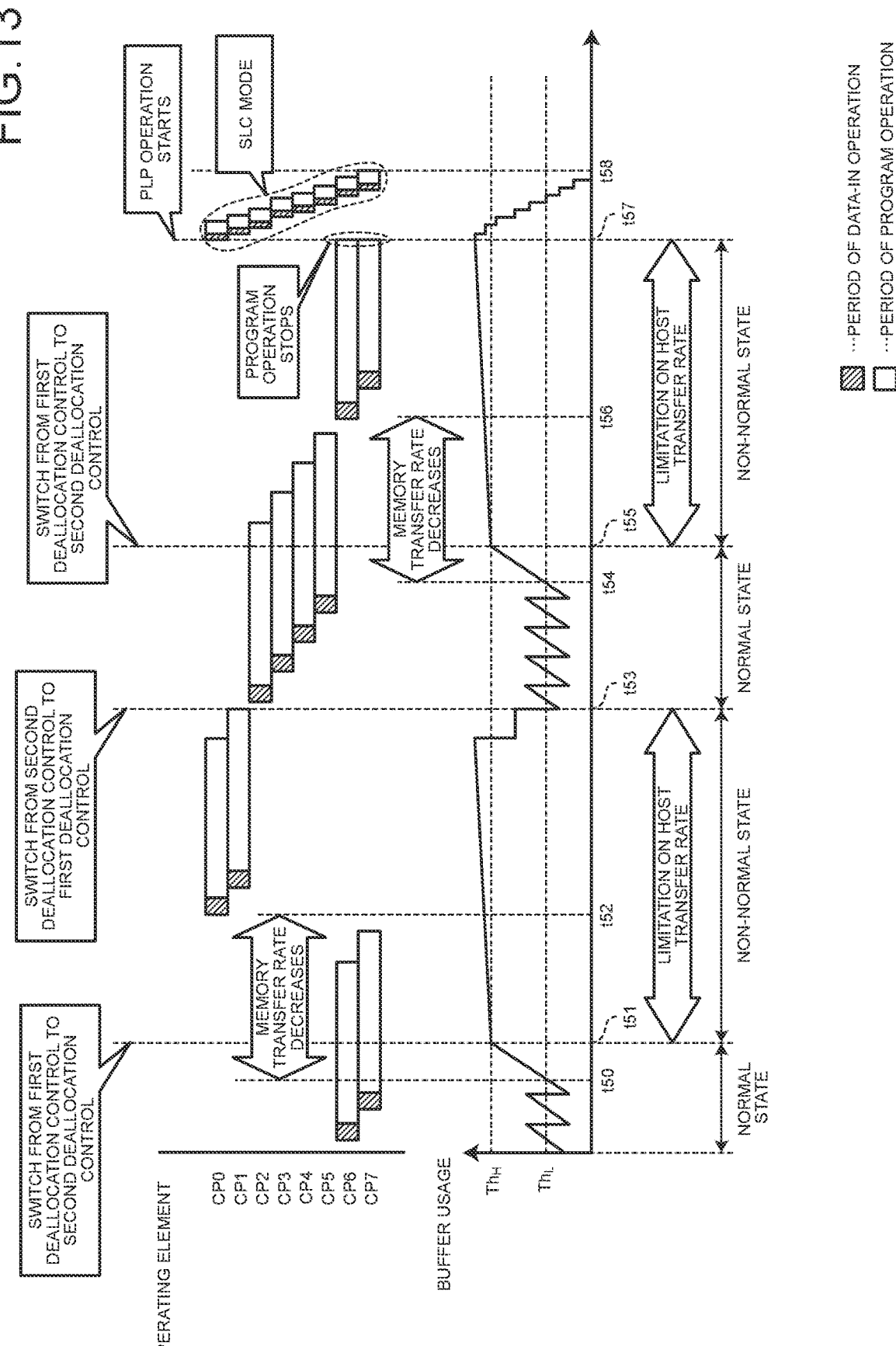
FIG. 13 is a schematic diagram illustrating an example of control of the memory system of the embodiment.

FIG. 13 is a schematic diagram illustrating an example of control implemented by the operation described above. Similarly to FIG. 7, an example of temporal transition of the buffer usage is illustrated in the lower part of the drawing. In the upper part, temporal transition of the operation status of the NAND memory 12 is illustrated.

In the example illustrated in FIG. 13, at a timing t50 in a period during which the buffer usage is in the normal state, program operations in the TLC mode are being executed in the memory chip CP6 and the memory chip CP7. At the timing t50, a delay in the progress of the program operation occurs, whereby the memory transfer rate decreases. As a result, the buffer usage starts to increase from the timing t50, and the buffer usage exceeds the threshold value $Th_H$ at a timing t51. Then, the state of the buffer usage transitions from the normal state to the non-normal state. That is, at the timing t51, the deallocation control is switched from the first deallocation control to the second deallocation control, and the limitation of the host transfer rate is started. Decrease in the memory transfer rate is resolved at a timing t52, whereas the buffer usage is not below the threshold value $Th_L$. Therefore, the control in the non-normal state (the second deallocation control and the limitation of the host transfer rate) is continued.

When the buffer usage falls below the threshold value $Th_L$ at a timing t53, the state of the buffer usage transitions from the non-normal state to the normal state. That is, at the timing t53, the deallocation control is switched from the second deallocation control to the first deallocation control, and the limitation of the host transfer rate is terminated.

Then, at a timing t54, the progress of the program operation is delayed again, and the memory transfer rate drops. As a result, the buffer usage starts to increase from the timing t54, and the buffer usage exceeds the threshold value Thu at a timing t55. Then, the state of the buffer usage transitions from the normal state to the non-normal state. That is, at the timing t55, the deallocation control is switched from the first deallocation control to the second deallocation control, and the limitation of the host transfer rate is started.

Decrease in the memory transfer rate is resolved at a timing t56, whereas the buffer usage is not below the threshold value $Th_L$, and thus the control in the non-normal state (the second deallocation control and the limitation of the host transfer rate) is continued.

Then, the PLP operation is started at a timing t57.

In the PLP operation, first, any program operation subsequent to a data-in operation that is completed when the buffer usage is in the non-normal state is stopped by the processing described by referring to steps S402 to S403 in FIG. 12. In the example illustrated in FIG. 13, the program operation executed in the memory chip CP6 and the program operation executed in the memory chip CP7 correspond to a program operation subsequent to a data-in operation that is completed when the buffer usage is in the non-normal. Therefore, the program operation executed in the memory chip CP6 and the program operation executed in the memory chip CP7 are stopped.

At the timing t57, among the program operations that are being executed, no program operation is subsequent to a data-in operation that is completed when the buffer usage is in the normal state. Therefore, by the stopping of the program operation executed in the memory chip CP6 and the program operation executed in the memory chip CP7, the program operation of all data units is not under execution. Thus, the determination of No is made in the determination processing of step S404 of FIG. 12.

At the time when the program operation executed in the memory chip CP6 and the program operation executed in the memory chip CP7 are stopped, the buffer area 40 stores data units for which the program operation has not been completed, including data units for which the program operation has been stopped. Therefore, the determination of Yes is made in the determination processing of step S405 of FIG.

12, and the data saving in the SLC mode is started. Then, at a timing t58, the data saving to the NAND memory 12 in the SLC mode is completed, and the PLP operation is completed.

As described above, according to the embodiment, upon receiving a write request from the host 2, the memory controller 11 allocates an area unit to a buffer area 40 and writes a data unit requested to be written by the write request to the NAND memory 12 via the area unit. The write operation of the data unit to the NAND memory 12 includes the data-in operation and the program operation. In a case where the timing of completion of the data-in operation of the data unit is before detection of power loss (in other words, before the start of the PLP operation), the memory controller 11 executes the program operation in the TLC mode, which is the first program operation, as the program operation started before the timing t57 illustrated in FIG. 13, for example. In a case where the timing of completion of the data-in operation of the data unit is after detection of power loss (in other words, after the start of the PLP operation), the memory controller 11 executes the program operation in the SLC mode, which is the second program operation, as the program operation started after the timing t57 illustrated in FIG. 13, for example. In a case where the usage of the buffer area is in the normal state at the timing of the completion of the data-in operation, the memory controller 11 deallocates the area unit upon the completion of the data-in operation. In a case where the usage of the buffer area is in the non-normal state at the timing of the completion of the data-in operation, the memory controller 11 deallocates the area unit upon completion of the program operation. After the power loss is detected, the memory controller 11 operates using the electric energy stored in the capacitor 15. After the power loss is detected, the memory controller 11 executes the following operation. That is, in a case where the program operation of a data unit in the TLC mode is being executed and an area unit storing the data unit has been deallocated, the memory controller 11 continues the program operation of the data unit in the TLC mode until completion. In a case where the program operation of a data unit in the TLC mode is being executed and an area unit storing the data unit has not been deallocated yet, the memory controller 11 stops the program operation of the data unit in the TLC mode. The memory controller 11 writes the data unit stored in the area unit not yet deallocated in the buffer area 40 to the NAND memory 12 by the program operation in the SLC mode.

Therefore, the power consumption necessary for the PLP operation can be reduced in both the case where the buffer usage is large and the case where the buffer usage is small.

In addition, according to the embodiment, the state of the buffer usage is recognized as the normal state from when the usage of the buffer area 40 falls below the threshold value $Th_L$ to when the usage of the buffer area 40 exceeds the threshold value $Th_H$, and the state of the buffer usage is recognized as the non-normal state from when the usage of the buffer area 40 exceeds the threshold value $Th_H$ to when the usage of the buffer area 40 falls below the threshold value $Th_L$.

Therefore, the frequency of transitions between the normal state and the non-normal state can decrease, and the operation of the memory system 1 can be stabilized.

Note that the definitions of the normal state and the non-normal state are not limited to the above. At least a period during which the usage of the buffer area 40 is below the threshold value $Th_L$ may be set to the normal state, and a period during which the usage of the buffer area 40 exceeds the threshold value Thu may be set to the non-normal state. That is, a state where the usage of the buffer area 40 takes a value between the threshold value $Th_L$ and the threshold value Thu may be set in any manner. In addition, the threshold value $Th_L$ and the threshold value Thu may be equal to each other.

In addition, according to the embodiment, the memory controller 11 sets no limitation on the host transfer rate in the normal state, whereas sets limitation on the host transfer rate in the non-normal state.

Therefore, an extreme increase in latency to a write request from the host 2 due to exhaustion of areas to which an area unit can be allocated in the buffer area 40 is avoided.

According to the embodiment, in a case where the first buffer area 41 includes an area to which an area unit can be allocated, the memory controller 11 allocates an area unit to the first buffer area 41. In a case where the first buffer area 41 does not include an area to which an area unit can be allocated, the memory controller 11 allocates an area unit to the second buffer area 42. The threshold value Thu may be equal to the capacity of the first buffer area 41.

Therefore, in the non-normal state, the second buffer area 42 included in the DRAM 13 inferior to the SRAM 34 in terms of the operation speed may be used. Since the host transfer rate is limited in the non-normal state, however, the throughput of transfer of write data to the memory system 1 is avoided from being deteriorated due to the inferior operation speed of the second buffer area 42.

Note that, in the above description, the buffer area 40 may not be necessarily included in both the SRAM 34 and the DRAM 13. The buffer area 40 may be included in only one of the SRAM 34 and the DRAM 13.

Some modifications of the embodiment will be described below. In each of the modifications, the same matters as those in the embodiment or the same matters as those in a modification already described will be omitted or briefly described.

First Modification

Figure 14:
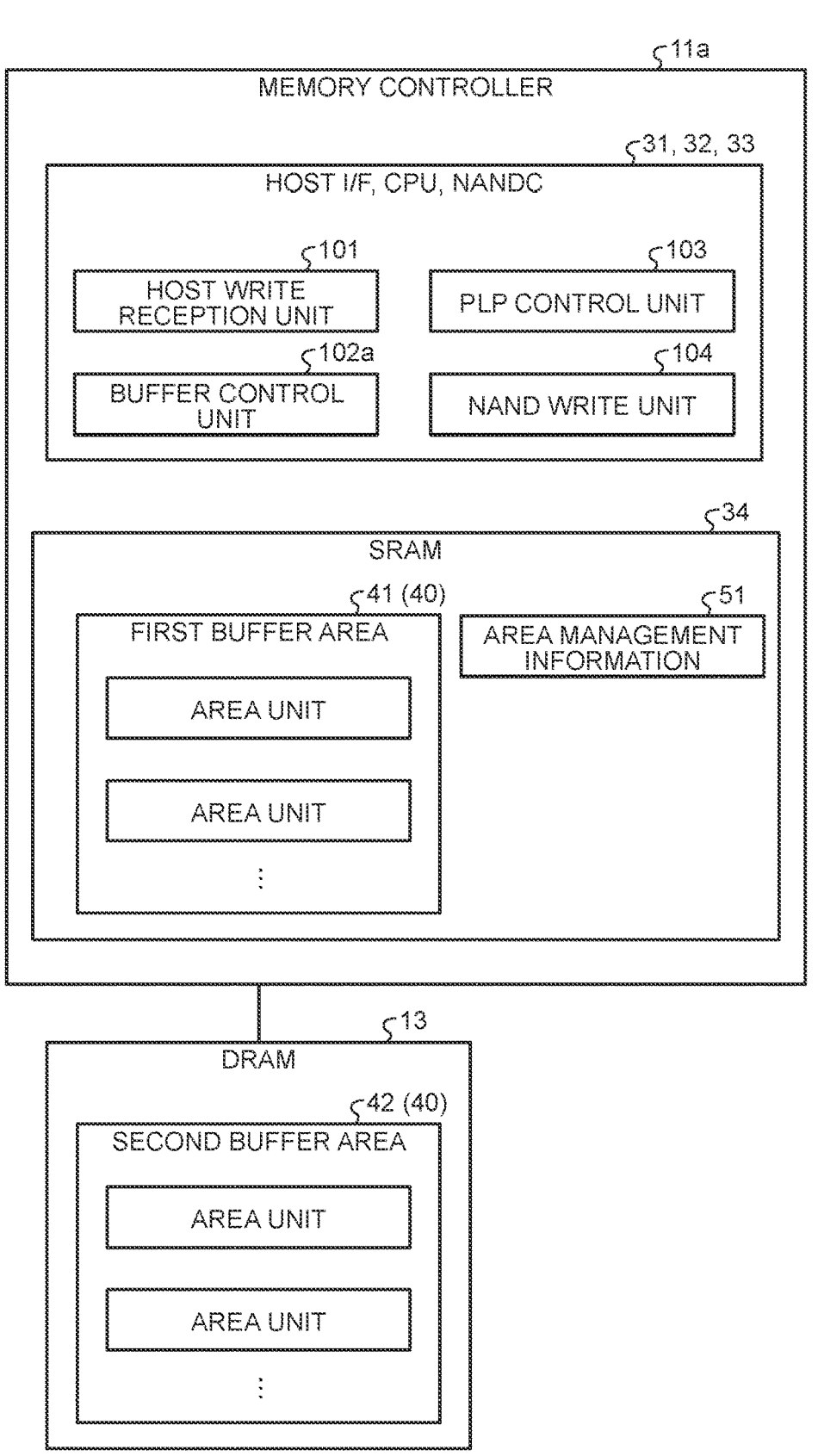
FIG. 14 is a schematic diagram illustrating an example of the functional configuration of a memory controller according to a first modification of the embodiment.

FIG. 14 is a schematic diagram illustrating an example of the functional configuration of a memory controller 11a according to a first modification of the embodiment.

The memory controller 11a functions as a host write reception unit 101, a buffer control unit 102a, a PLP control unit 103, and a NAND write unit 104 by cooperation of some of or all the host I/F 31, the two NANDCs 32, and the CPU 33.

A first buffer area 41 is included in the SRAM 34, and a second buffer area 42 is included in the DRAM 13.

In addition, the SRAM 34 stores area management information 51.

The function of the buffer control unit 102a is different from the function of the buffer control unit 102 in the method of switching the deallocation control. The buffer control unit 102a decides the deallocation control of an area unit in accordance with the state of the buffer usage at an allocation timing of the area unit. The area management information 51 is information in which the state of the buffer usage at the time of allocation of an area unit is recorded for each area unit. A method of deciding the deallocation control by the buffer control unit 102a will be described by referring to FIGS. 15 and 16.

FIG. 15 is a flowchart illustrating an example of operation when the memory system 1 of the first modification of the embodiment receives a write request from the host 2.

As illustrated in FIG. 15, the host write reception unit 101 or the buffer control unit 102a of the first modification of the embodiment executes processing similar to the processing of steps S201 to S204 executed by the host write reception unit 101 or the buffer control unit 102 of the embodiment described by referring to FIG. 10.

After the processing of step S203 or the processing of step S204, namely, when allocation of an area unit is completed, the buffer control unit 102a records identification information indicating the allocated area unit and the state of the buffer usage in the area management information 51 to correlate with each other (S501).

After the processing of step S501, the host write reception unit 101 or the buffer control unit 102a of the first modification of the embodiment executes processing similar to the processing of steps S205 to S208 executed by the host write reception unit 101 or the buffer control unit 102 of the embodiment described by referring to FIG. 10.

In this manner, when allocating the area unit, the buffer control unit 102a records the state of the buffer usage in the area management information 51.

Figure 16:
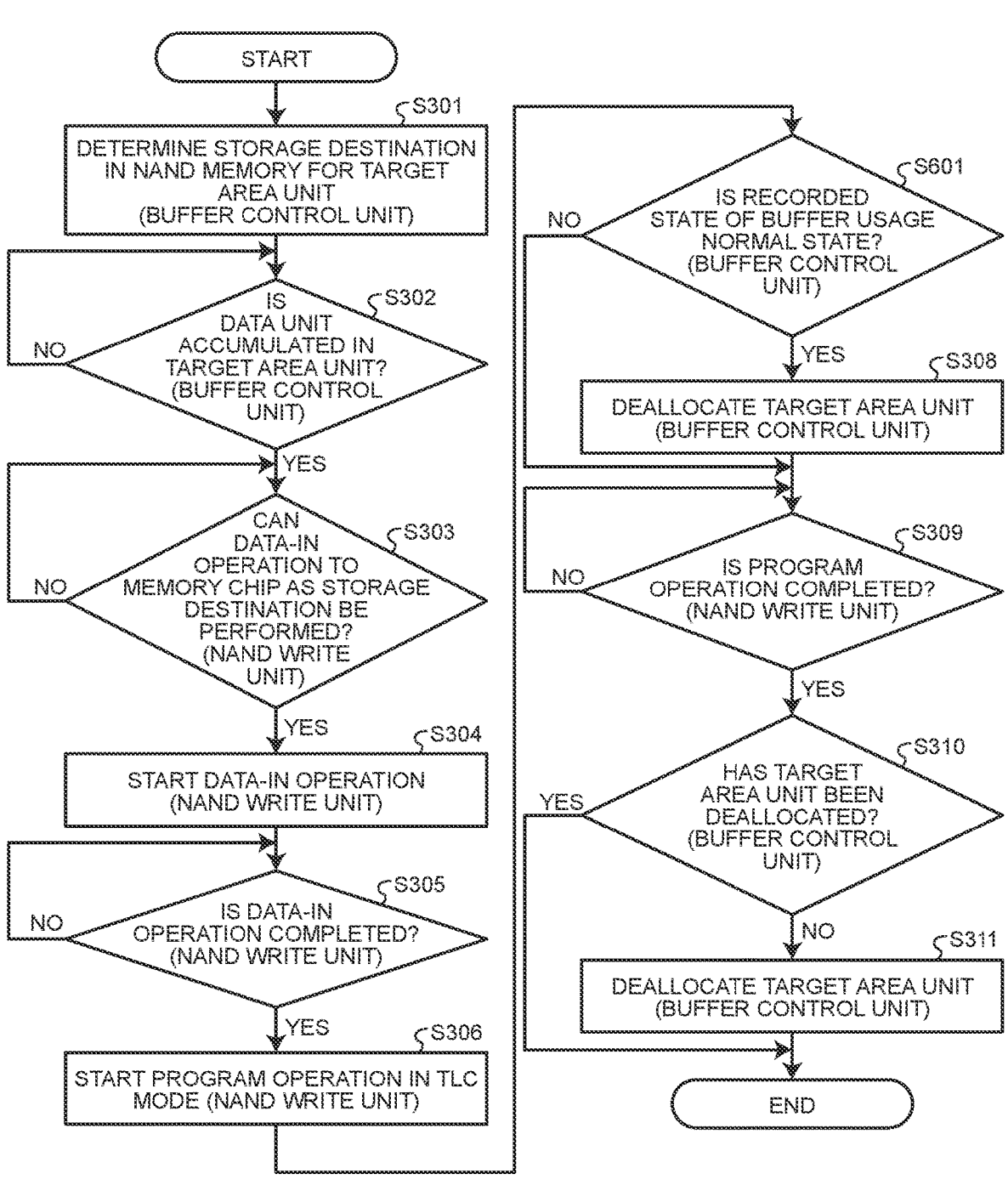
FIG. 16 is a flowchart illustrating an example of a write operation to a NAND memory in a period during which power loss is not detected in the memory system of the first modification of the embodiment.

FIG. 16 is a flowchart illustrating an example of a write operation to the NAND memory 12 in a period during which power loss is not detected in the memory system 1 of the first modification of the embodiment. An operation related to one area unit that is allocated (referred to as a target area unit) will be described. Note that, in a case where two or more area units are allocated, the operation illustrated in the drawing is executed for each of the allocated area units.

As illustrated in FIG. 16, the NAND write unit 104 or the buffer control unit 102a of the first modification of the embodiment executes processing similar to the processing of steps S301 to S306 executed by the NAND write unit 104 or the buffer control unit 102 of the embodiment described by referring to FIG. 11.

When the data-in operation of a data unit in a target area unit is completed (S305: Yes), the NAND write unit 104 causes a memory chip CP as the storage destination to start the program operation (S306). This program operation is executed in the TLC mode.

The buffer control unit 102a is also notified, from the NAND write unit 104, that the data-in operation of the data unit in the target area unit has been completed. The buffer control unit 102a, which has received the notification, determines whether or not the state of the buffer usage recorded in the area management information 51 correlating with identification information of the target area unit is the normal state (S601). That is, the buffer control unit 102a checks the state of the buffer usage at the timing when the target area unit was allocated.

When the state of the buffer usage recorded in the area management information 51 correlating with the identification information of the target area unit is the normal state (S601: Yes), the buffer control unit 102a deallocates the target area unit (S308).

When the state of the buffer usage recorded in the area management information 51 correlating with the identification information of the target area unit is not the normal state (S601: No), that is, when the non-normal state is recorded in the area management information 51 correlating with the identification information of the target area unit, the processing of step S308 is skipped.

Thereafter, the NAND write unit 104 or the buffer control unit 102a of the first modification of the embodiment executes processing similar to the processing of steps S309 to S311 executed by the NAND write unit 104 or the buffer control unit 102 of the embodiment described by referring to FIG. 11.

As described above, according to the first modification of the embodiment, in a case where the usage of the buffer area is in the normal state at the timing of allocation of an area unit, the memory controller 11 deallocates the area unit upon completion of the data-in operation. In a case where the usage of the buffer area is in the non-normal state at the timing of allocation of an area unit, the memory controller 11 deallocates the area unit upon completion of the program operation.

Second Modification

According to a second modification of the embodiment, the buffer control unit 102a decides deallocation control of an area unit in accordance with both the state of the buffer usage at the allocation timing of the area unit and the state of the buffer usage at a timing when the data-in operation is completed. Hereinafter, among matters of the second modification of the embodiment, those different from the matters according to the first modification of the embodiment will be described.

Figure 17:
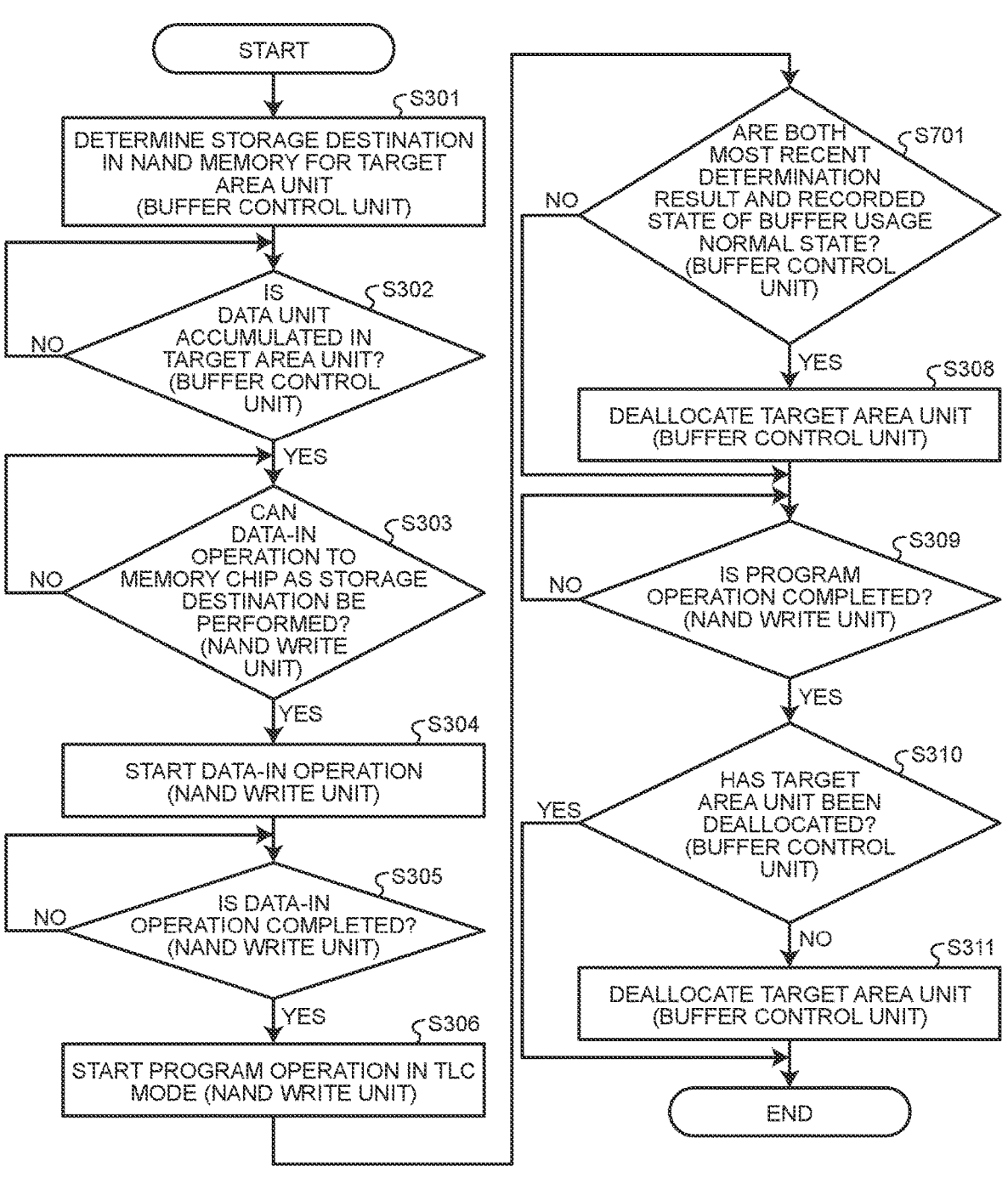
FIG. 17 is a flowchart illustrating an example of a write operation to a NAND memory in a period during which power loss is not detected in a memory system of a second modification of the embodiment.

FIG. 17 is a flowchart illustrating an example of a write operation to the NAND memory 12 in a period in which power loss is not detected in a memory system 1 of the second modification of the embodiment. An operation related to one area unit that is allocated (referred to as a target area unit) will be described. Note that, in a case where two or more area units are allocated, the operation illustrated in the drawing is executed for each of the allocated area units.

As illustrated in FIG. 17, the NAND write unit 104 or the buffer control unit 102a of the second modification of the embodiment executes processing similar to the processing of steps S301 to S306 executed by the NAND write unit 104 or the buffer control unit 102 (or the buffer control unit 102a) of the embodiment and the first modification of the embodiment described by referring to FIGS. 11 and 16.

When the data-in operation of a data unit in a target area unit is completed (S305: Yes), the NAND write unit 104 causes a memory chip CP as the storage destination to start the program operation (S306). This program operation is executed in the TLC mode.

The buffer control unit 102a is also notified, from the NAND write unit 104, that the data-in operation of the data unit in the target area unit has been completed. The buffer control unit 102a that has received the notification determines whether or not the most recent determination result by the state determination operation indicates the normal state and whether or not the state of the buffer usage recorded in the area management information 51 correlating with the identification information of the target area unit is the normal state (S701).

When the most recent determination result by the state determination operation indicates the normal state and the state of the buffer usage recorded in the area management information 51 correlating with the identification information of the target area unit is the normal state (S701: Yes), the buffer control unit 102a deallocates the target area unit (S308).

When the most recent determination result by the state determination operation is the non-normal state, or when the state of the buffer usage recorded in the area management information 51 correlating with the identification information of the target area unit is the non-normal state (S701: No), the processing of step S308 is skipped.

Thereafter, the NAND write unit 104 or the buffer control unit 102a of the second modification of the embodiment executes processing similar to the processing of steps S309 to S311 executed by the NAND write unit 104 or the buffer control unit 102 (or the buffer control unit 102a) of the embodiment and the first modification of the embodiment described by referring to FIGS. 11 and 16.

As described above, according to the second modification of the embodiment, in a case where the usage of the buffer area is in the normal state at both the allocation timing of an area unit and the completion timing of the data-in operation of a data unit stored in the area unit, the memory controller 11 deallocates the area unit upon completion of the data-in operation. In a case where the usage of the buffer area is in the non-normal state at either the allocation timing of an area unit or the completion timing of the data-in operation of a data unit stored in the area unit, the memory controller 11 deallocates the area unit upon completion of the program operation.

As described in the embodiment and the modifications thereof, the buffer control units 102 and 102a decide the deallocation control in accordance with the state of the buffer usage at the setting timing within a period from allocation of a target area unit to completion of the data-in operation of a data unit in the target area unit. In the embodiment, the timing of completion of the data-in operation is treated as the setting timing (an example of the first timing). In the first modification of the embodiment, the timing at which an area unit is allocated is set as the setting timing. In the second modification of the embodiment, the timing at which an area unit is allocated and the timing at which the data-in operation is completed are both treated as the setting timing.

As described above, any timing within a period from allocation of a target area unit to completion of the data-in operation of a data unit in the target area unit can be treated as the setting timing.

While some embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, the memory system comprising:
   a first memory including a latch circuit and a memory cell array that includes a plurality of memory cells, the first memory being a non-volatile memory;
   a second memory that is a volatile memory; and
   a memory controller configured to, in response to receiving a write request from the host,
      allocate an area unit to a buffer area of the second memory;
      store a data unit in the area unit, the data unit being requested by the write request to be written to the first memory;
      execute, on the data unit, a write operation including a data-in operation and a program operation, the data-in operation being an operation of transferring the data unit to the latch circuit of the first memory, the program operation being an operation of writing the data unit transferred to the latch circuit of the first memory by the data-in operation to the memory cell array; and
      determine, in accordance with a usage of the buffer area, wherein the usage of the buffer area is a total number of sizes of allocated area units in the buffer area, whether the area unit is to be deallocated upon completion of the data-in operation on the data unit or whether the area unit is to be deallocated upon completion of the program operation on the data unit,
   wherein the memory controller is further configured to, at a first timing within a period from the allocation of the area unit to the completion of the data-in operation on the data unit stored in the area unit:
      when the usage of the buffer area is in a first state in which the usage of the buffer area is smaller than a first threshold value, deallocate the area unit upon the completion of the data-in operation on the data unit; and
      when the usage of the buffer area is in a second state in which the usage of the buffer area is larger than a second threshold value, the second threshold value being larger than the first threshold value, deallocate the area unit not upon the completion of the data-in operation on the data unit but upon the completion of the program operation on the data unit.

2. The memory system according to claim 1, further comprising a power storage device configured to store electric energy,
   wherein the memory controller is further configured to:
      operate using the electric energy stored in the power storage device after detection of power loss;
      execute a first program operation of writing data containing a first number of bits per memory cell in the program operation on the data unit, the first program operation being executed in a case where a second timing that is a timing of the completion of the data-in operation on the data unit is after the detection of the power loss, and
      execute a second program operation of writing data containing a second number of bits per memory cell in the program operation on the data unit, the second number being larger than the first number, the second program operation being executed in a case where the second timing is before the detection of the power loss.

3. The memory system according to claim 2, wherein the memory controller is further configured to, after the power loss is detected,
   continue the second program operation on the data unit until completion in a case where the second program operation on the data unit is being executed at the detection of the power loss and the area unit storing the data unit has already been deallocated at the detection of the power loss; and,
   in a case where the second program operation on the data unit is being executed at the detection of the power loss and the area unit storing the data unit has not yet been deallocated at the detection of the power loss, stop the second program operation on the data unit and write the data unit stored in the area unit, which has not yet been deallocated, to the first memory by the first program operation.

4. The memory system according to claim 2, wherein the first timing is a timing at which the data-in operation on the data unit is completed.

5. The memory system according to claim 1, wherein the memory controller is further configured to:

set no limitation on a transfer rate of data from the host to the memory controller in the first state; and set limitation on the transfer rate of data from the host to the memory controller in the second state.

6. The memory system according to claim 1, wherein the first state is a state of the usage of the buffer area in a period from when the usage of the buffer area becomes smaller than the first threshold value to when the usage of the buffer area becomes larger than the second threshold value, and the second state is a state of the usage of the buffer area in a period from when the usage of the buffer area becomes larger than the second threshold value to when the usage of the buffer area becomes smaller than the first threshold value.

7. The memory system according to claim 1, wherein the second memory includes a third memory and a fourth memory, the fourth memory operating at a lower speed than the third memory and having a larger capacity than the third memory, the buffer area includes a first buffer area provided in the third memory and a second buffer area provided in the fourth memory, the second threshold value is equal to a capacity of the first buffer area, and the memory controller is configured to allocate the area unit to the first buffer area in a case where the first buffer area includes an area to which allocation of the area unit is available, and allocate the area unit to the second buffer area in a case where the first buffer area includes no area to which allocation of the area unit is available.

8. The memory system according to claim 1, wherein the first timing is a timing at which the data-in operation on the data unit is completed.

9. The memory system according to claim 1, wherein the first timing is a timing at which the area unit is allocated.

10. The memory system according to claim 1, wherein the first timing includes a timing at which the area unit is allocated and a timing at which the data-in operation on the data unit is completed.

11. A method of controlling a first memory, the first memory being a non-volatile memory and including a latch circuit and a memory cell array that includes a plurality of memory cells, the method comprising:

in response to receiving a write request from a host, allocating an area unit to a buffer area of a second memory that is a volatile memory;

storing a data unit in the area unit, the data unit being requested by the write request to be written to the first memory; and executing, on the data unit, a write operation including a data-in operation and a program operation, the data-in operation being an operation of transferring the data unit to the latch circuit of the first memory, the program operation being an operation of writing the data unit transferred to the latch circuit of the first memory by the data-in operation to the memory cell array;

determining, in accordance with a usage of the buffer area, wherein the usage of the buffer area is a total number of sizes of allocated area units in the buffer area, whether the area unit is to be deallocated upon completion of the data-in operation on the data unit or whether the area unit is to be deallocated upon completion of the program operation on the data unit; and at a first timing within a period from the allocation of the area unit to the completion of the data-in operation on the data unit stored in the area unit, determining the usage of the buffer area is in a first state in which the usage of the buffer area is smaller than a first threshold value;

in response to determining that the usage of the buffer area is in the first state, deallocating the area unit upon the completion of the data-in operation on the data unit;

determining that the usage of the buffer area is in a second state in which the usage of the buffer area is larger than a second threshold value, the second threshold value being larger than the first threshold value; and in response to determining that the usage of the buffer area is in the second state, deallocating the area unit not upon the completion of the data-in operation on the data unit but upon the completion of the program operation on the data unit.

12. The method according to claim 11, further comprising:

storing electric energy in a power storage device;

detecting power loss;

starting to use the electric energy stored in the power storage device after the detection of the power loss;

determining that the data-in operation on the data unit is completed at a second timing after the detection of the power loss;

executing a first program operation of writing data containing a first number of bits per memory cell in the program operation on the data unit, in response to determining that the data-in operation on the data unit is completed at the second timing;

determining that the data-in operation on the data unit is completed at a third timing before the detection of the power loss; and executing a second program operation of writing data containing a second number of bits per memory cell in the program operation on the data unit, in response to determining that the data-in operation on the data unit is completed at the third timing, the second number being larger than the first number.

13. The method according to claim 12, further comprising:

after the power loss is detected, determining that a first condition is satisfied, the first condition being a condition in which the second program operation on the data unit is being executed at the detection of the power loss and the area unit storing the data unit has already been deallocated;

continuing the second program operation on the data unit until completion, in response to determining that the first condition is satisfied;

determining that a second condition is satisfied, the second condition being a condition in which the second program operation on the data unit is being executed at the detection of the power loss and the area unit storing the data unit has not yet been deallocated; and stopping the second program operation on the data unit and writing the data unit stored in the area unit, which has not yet been deallocated, to the first memory by the first program operation, in response to determining that the a second condition is satisfied.

14. The method according to claim 12, wherein the first timing is a timing at which the data-in operation on the data unit is completed.

15. The method according to claim 11, further comprising:

setting no limitation on a transfer rate of data from the host in the first state; and setting limitation on the transfer rate of data from the host in the second state.

16. The method according to claim 11, wherein the first state is a state of the usage of the buffer area in a period from when the usage of the buffer area becomes smaller than the first threshold value to when the usage of the buffer area becomes larger than the second threshold value, and the second state is a state of the usage of the buffer area in a period from when the usage of the buffer area becomes larger than the second threshold value to when the usage of the buffer area becomes smaller than the first threshold value.

17. The method according to claim 11, wherein the second memory includes a third memory and a fourth memory, the fourth memory operating at a lower speed than the third memory and having a larger capacity than the third memory, the buffer area includes a first buffer area provided in the third memory and a second buffer area provided in the fourth memory, the second threshold value is equal to a capacity of the first buffer area, and the method further comprises:

determining that the first buffer area includes an area to which allocation of the area unit is available;

allocating the area unit to the first buffer area in response to determining that the first buffer area includes the area to which allocation of the area unit is available;

determining that the first buffer area includes no area to which allocation of the area unit is available; and allocating the area unit to the second buffer area in response to determining that the first buffer area includes no area to which allocation of the area unit is available.

18. The method according to claim 11, wherein the first timing is a timing at which the data-in operation on the data unit is completed.

19. The method according to claim 11, wherein the first timing is a timing at which the area unit is allocated.

20. The method according to claim 11, wherein the first timing includes a timing at which the area unit is allocated and a timing at which the data-in operation on the data unit is completed.

21. A memory system connectable to a host, the memory system comprising:

a power storage device configured to store electric energy;

a first memory including a latch circuit and a memory cell array that includes a plurality of memory cells, the first memory being a non-volatile memory;

a second memory that is a volatile memory; and a memory controller configured to, in response to receiving a write request from the host, allocate an area unit to a buffer area of the second memory;

store a data unit in the area unit, the data unit being requested by the write request to be written to the first memory; and execute, on the data unit, a data-in operation which is an operation of transferring the data unit to the latch circuit of the first memory, wherein the memory controller is further configured to:

when a usage of the buffer area is in a first state in which the usage of the buffer area is smaller than a first threshold value, the usage of the buffer area being a total number of sizes of allocated area units in the buffer area, deallocate the area unit upon completion of the data-in operation on the data unit;

execute a first program operation on the data unit, the first program operation being an operation of writing the data unit transferred to the latch circuit of the first memory by the data-in operation to the memory cell array such that a first number of bits are written per memory cell; and upon detecting power loss from an external power source to the memory system before completion of the first program operation on the data unit, by using the electric energy stored in the power storage device, continue the first program operation on the data unit, and when the usage of the buffer area is in a second state in which the usage of the buffer area is larger than a second threshold value, the second threshold value being larger than the first threshold value, maintain the area unit to be allocated upon the completion of the data-in operation on the data unit;

execute the first program operation on the data unit; and upon detecting the power loss from the external power source to the memory system before the completion of the first program operation on the data unit, by using the electric energy stored in the power storage device, stop the first program operation on the data unit;

execute the data-in operation on the data unit again; and execute a second program operation on the data unit, the second program operation being an operation of writing the data unit transferred to the latch circuit of the first memory by the data-in operation to the memory cell array such that a second number of bits are written per memory cell, the second number being smaller than the first number.

22. The memory system according to claim 21, wherein the memory controller is further configured to:

set no limitation on a transfer rate of data from the host to the memory controller in the first state; and set limitation on the transfer rate of data from the host to the memory controller in the second state.

23. The memory system according to claim 21, wherein the first state is a state of the usage of the buffer area in a period from when the usage of the buffer area becomes smaller than the first threshold value to when the usage of the buffer area becomes larger than the second threshold value, and the second state is a state of the usage of the buffer area in a period from when the usage of the buffer area becomes larger than the second threshold value to when the usage of the buffer area becomes smaller than the first threshold value.

24. The memory system according to claim 21, wherein the second memory includes a third memory and a fourth memory, the fourth memory operating at a lower speed than the third memory and having a larger capacity than the third memory, the buffer area includes a first buffer area provided in the third memory and a second buffer area provided in the fourth memory, the second threshold value is equal to a capacity of the first buffer area, and the memory controller is configured to allocate the area unit to the first buffer area in a case where the first buffer area includes an area to which allocation of the area unit is available, and allocate the area unit to the second buffer area in a case where the first buffer area includes no area to which allocation of the area unit is available.

\* \* \* \* \*